US006895095B1

(12) United States Patent
Thomas

(10) Patent No.: US 6,895,095 B1
(45) Date of Patent: May 17, 2005

(54) METHOD OF ELIMINATING INTERFERENCE IN A MICROPHONE

(75) Inventor: Hans-Jörg Thomas, Neu-Ulm (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/285,064

(22) Filed: Apr. 2, 1999

(30) Foreign Application Priority Data

Apr. 3, 1998 (DE) ........................................ 198 14 971

(51) Int. Cl.[7] ................................................ H04B 15/00
(52) U.S. Cl. .................................. 381/94.7; 379/406.12
(58) Field of Search ........................... 381/94.1, 66, 93, 381/95, 96, 83, 94.7; 379/406.05, 406.06, 406.12

(56) References Cited

U.S. PATENT DOCUMENTS 5,649,012 A * 7/1997 Gupta et al. ........... 379/406.09
5,937,060 A * 8/1999 Oh ........................ 379/406.14
6,246,760 B1 * 6/2001 Makino et al. ........ 379/406.08

* cited by examiner

*Primary Examiner*—Ping Lee
(74) *Attorney, Agent, or Firm*—Venable LLP; Catherine M. Voorhees

(57) ABSTRACT

A method of eliminating interference components in a microphone signal by generating a compensation signal and subtracting the compensation signal from the microphone signal. The compensation occurs completely in the frequency domain and the output signal is processed in the frequency domain as well. Measures for reducing the expenditure during the signal processing are specified. For example, advantageous modifications provide that a filter setting, obtained during a preceding speech pause, be used for eliminating interference in a voice signal and/or that the simulation filter be divided into several partial filters for long pulse responses. In particular, the invention is suitable for eliminating interference signal components, e.g., caused by a radio or the like, from a voice input signal in a motor vehicle, the source signal of which is available as reference signal.

11 Claims, 28 Drawing Sheets b) block diagram of the FLMS algorithm a) principle of radio compensation with adaptive filter (LMS algorithm)

b) block diagram of the FLMS algorithm a) block diagram of the FLMS algorithm with 1 partial filter b) expansion to 3 partial filters a) FLMS algorithm with output in the time domain b ) FLMS algorithm with output in frequency domain ideal projection P4 with rectangular window in the time domain modified projection P4 with Hamming window in the time domain to b) equivalent convolution in the frequency domain (convolution with 7-line spectrum)

a) numbering of overlapping FFT blocks
b) projection P1 parallel in 3 partial filters
c) projection P1 sequential in 3 partial filters (block module 3)
d) projection P1 sequential in 3 partial filters (block module 6)
e) projection P1 sequential in 3 partial filters (block module 12)

scene Z2

Scene Z4

Scene Z4

METHOD OF ELIMINATING INTERFERENCE IN A MICROPHONE

CROSS-REFERENCE TO RELATED APPLICATIONS

The present application claims the right of foreign priority with respect to Application No. DE 19814971.9 on Apr. 3, 1998, the subject matter of which is incorporated herein by reference.

BACKGROUND OF THE INVENTION

The invention relates to a method of eliminating interference in a microphone signal.

Such methods are becoming more and more important for the voice input of commands and/or for hands-free telephones. In particular, they are used to correct the situation inside a motor vehicle.

A special situation frequently occurs in motor vehicles where a playback device, e.g., a radio, a tape player or a CD player, creates a noisy environment via a loudspeaker. This noise is superimposed as interference signal on a voice signal, picked up by a microphone, e.g., for the voice recognition or telephone transmission. In order to detect a voice input in a voice detector or to have an intelligible voice transmission via telephone, the microphone signal must be freed of as many interference signal components as possible.

The interference signal originating from an interference source, in particular a loudspeaker, not only travels directly, meaning via the shortest path, to the microphone, but appears also in the microphone signal via numerous reflections, as a superimposition of a plurality of echoes with different transit times. The total effect of the interference signal from the interference source to the microphone signal can be described by an a priori unknown transfer function of the space, e.g., the passenger space in a motor vehicle. This transfer function changes in dependence on the number of passengers in the vehicle and the position of the individual passengers. By simulating this transfer function and using this simulation to filter a reference signal from the interference source, a compensation signal can be generated, which supplies, for example, a pure voice signal that is free of any interference by subtracting it from the microphone signal. In the real case, the aforementioned simulation represents a more or less good approximation to the unknown transfer function, and the interference cannot be eliminated completely.

It is the object of the present invention to provide a method of eliminating interference in a microphone signal, which method displays good properties for eliminating interference along with an acceptable signal processing expenditure.

SUMMARY OF THE INVENTION

The above object generally is achieved according to the present invention by a method of eliminating interference in a microphone signal, which interference is caused by components of a source signal that is present as reference signal (x) and, following a pass through a transmission section with a priori unknown transfer function (G), is superimposed in the microphone signal as an interference signal (r) on a voice signal (s), with the method comprising: adaptively simulating the interference signal, and providing an output signal which has been compensated for the actual interference signal by subtraction of the simulated interference signal from the microphone signal; and wherein the microphone signal is simultaneously transformed to the frequency domain, the signal compensation occurs in the frequency domain, and the output signal present in the frequency domain is linked with the reference signal present in the frequency domain for the adaptation of the simulation of the reference signal.

The essential feature of the method is a compensation of the interference signal component in the microphone signal, which occurs in the frequency range or domain by means of a compensation signal that is generated from the reference signal via the simulation of the transfer function, so that the microphone signal, the compensation signal, and the output signal are present in the frequency domain, meaning in the form of spectra. To be sure, the processing of the signal during this processing step in the frequency domain requires a spectral transformation of the microphone signal. However, it takes into account that the simulation of the transfer function in the frequency domain is more advantageous and makes available a particularly suitable signal form for an advantageous, subsequent and additional-noise reduction of the output signal, which typically also occurs in the frequency domain.

A simple approximation when replacing a processing step with a time window makes it possible to effect a noticeable reduction of the processing expenditure by changing to a convolution in the frequency domain.

One advantageous modification of the invention provides that for long pulse responses of the transfer function or its simulation, the simulation filter is divided into several partial filters for time-displaced segments of the segmented reference signal. The coefficients for these segments can be updated at staggered time intervals to keep the signal processing expenditure low.

It has proven particularly advantageous to eliminate interference in a voice signal on the basis of a simulation filter setting, which was obtained and stored during a preceding speech pause.

Dividing the simulation filter into several partial filters and eliminating interference on the basis of a filter setting, obtained during a speech pause, can also be realized independently for eliminating interference in a microphone signal and can be advantageous, regardless of the interference signal compensation in the frequency domain.

The invention is illustrated in further detail below with the aid of exemplary embodiments and by referring to the Figures:

DETAILED DESCRIPTION OF THE PREFERRED EMBODIMENTS

Figure 1:
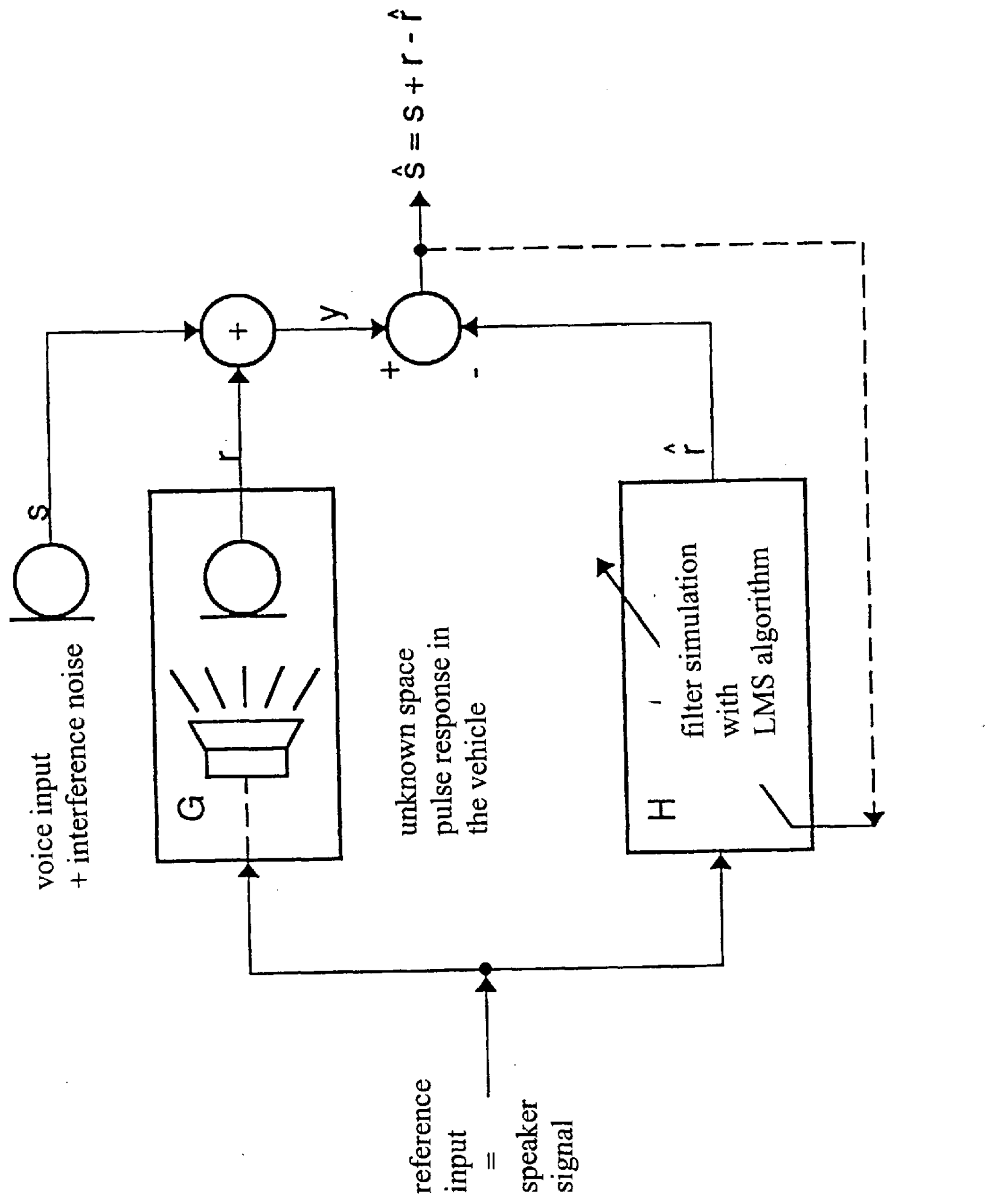
FIG. 1 illustrates the principle of compensating a radio signal.

FIG. 1 represents the principle for a (single channel) radio signal compensation device. The acoustic signal radiated by the loudspeaker travels to the microphone for the voice input system via a direct path, as well as via numerous reflections in the motor vehicle inside space. Assuming that the transmission path G consequently represents a transversal filter with a weighted sum of time-delayed echoes, a filter simulation H can be found, which permits in the ideal case, where H=G, a complete compensation of the radio signal.

The loudspeaker signal x is filtered by the a priory unknown transfer function G of the motor vehicle inside space. The resulting interference component r is then added together with the voice signal s to form the microphone signal y. In order to compensate the interference component r, an estimated value $\hat{r}$ is generated from the loudspeaker signal x by means of the filter simulation H. The circuit output supplies the estimated value for the voice signal:

$$\hat{s}+r-\hat{r}=s+E$$

Thus, the error signal $E=r-\hat{r}$ which should be kept as low as possible in practical operations, is additionally superimposed on the voice signal s at the circuit output. The voice signal can also contain interferences in the form of, for example, engine noises or external noises. However, these are not dealt with implicitly in this connection.

H is an adaptive filter and operates according to a standard method, known from the literature, the LMS algorithm (least mean squares). In addition to the input signal x, the error signal E is needed to effect the coefficient adaptation in the filter H. The output signal $\hat{s}$ is supplied for the filter H to determine the filtering coefficients.

Figure 2A:
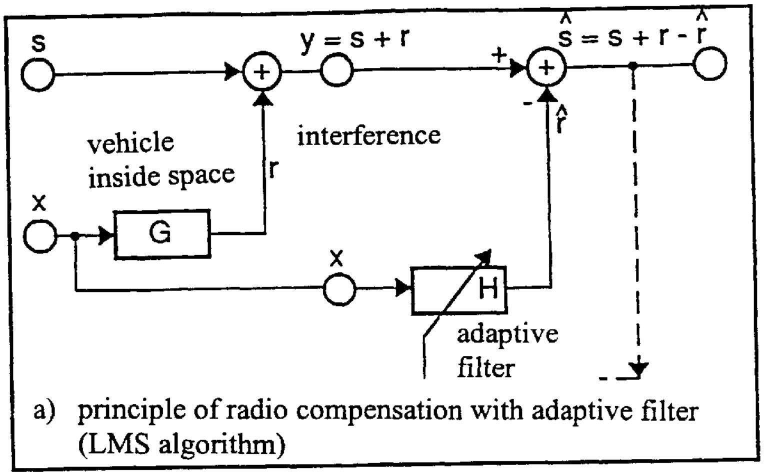
FIG. 2*a* is a block circuit diagram for the arrangement of FIG. 1.

In another embodiment, FIG. 2*a* again shows the arrangement in FIG. 1 as radio signal compensation. The adaptive system H can be realized, for example, in the time domain as a FIR filter (finite impulse response filter). However, very long pulse response lengths, which frequently occur in practical operations, require an extremely high calculation expenditure. Realizing the LMS algorithm in the frequency domain (FLMS) offers various advantages as compared to a time domain solution. Owing to the block-by-block processing of data in the spectral transformations, realized as discrete Fourier transformations, and the filter realization in the frequency domain through multiplication, this method has a particularly favorable calculation time.

Figure 2B:
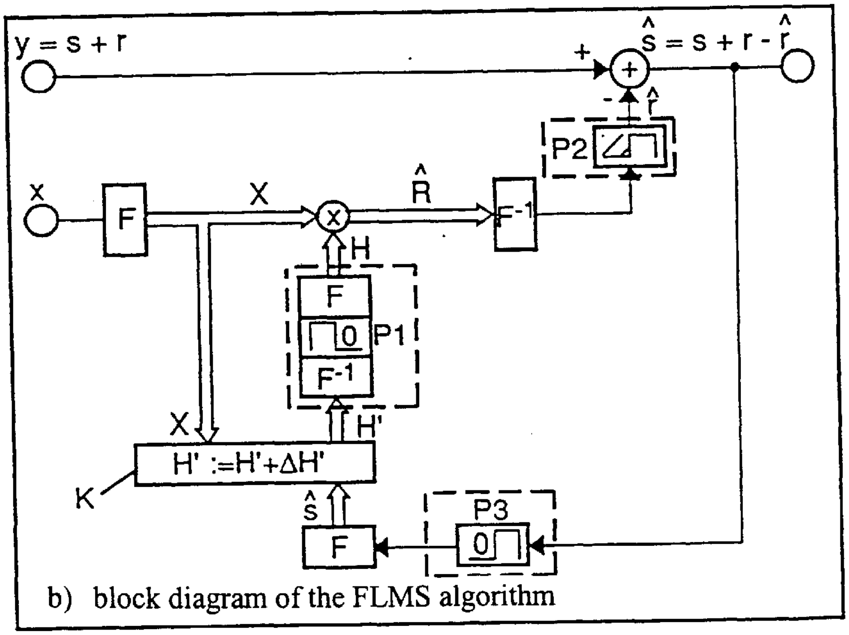
FIG. 2*b* is a block circuit diagram for the filter simulation.

FIG. 2*b* shows a block diagram of the FLMS algorithm. The associated theory is known per se and will therefore not be dealt with in detail here. F stands for a spectral transformation FFT of a time signal in the frequency domain and $F^{-1}$ represents the inverse IFFT. The processing steps, which are referred to as projections P1, P2 and P3, are used for the correct segmenting of data through a block-by-block use with the FFT or IFFT. They will be explained in more detail later on. The operational mode of the filter consists of multiplying the reference spectrum X with the filter coefficient vector H. The filter output spectrum R is transformed with $F^{-1}$ back to the time range. After applying the projection P2 to the real component of the compensation signal, obtained in this way, the signal $\hat{r}$ is made available. The difference between the signals $$\hat{s}=y-\hat{r}=s+r-\hat{r}=s+E$$

represents the actual output, an estimation of the voice input.

The coefficient adaptation in block K is an essential component of the adaptive filter and is described in FIG. 2*b* with the aid of the recursive equation $$H'=H'+\Delta H'$$

In the projection P1, which in this case is particularly involved because of two spectral transformations, the coefficient vector H that is needed for the filtering is computed from H'. In order to compute the correction vector ΔH', $s+r-\hat{r}$ is needed in addition to the reference spectrum X of spectrum $\hat{S}$ of the output signal weighted with $P_3$.

Figure 3:
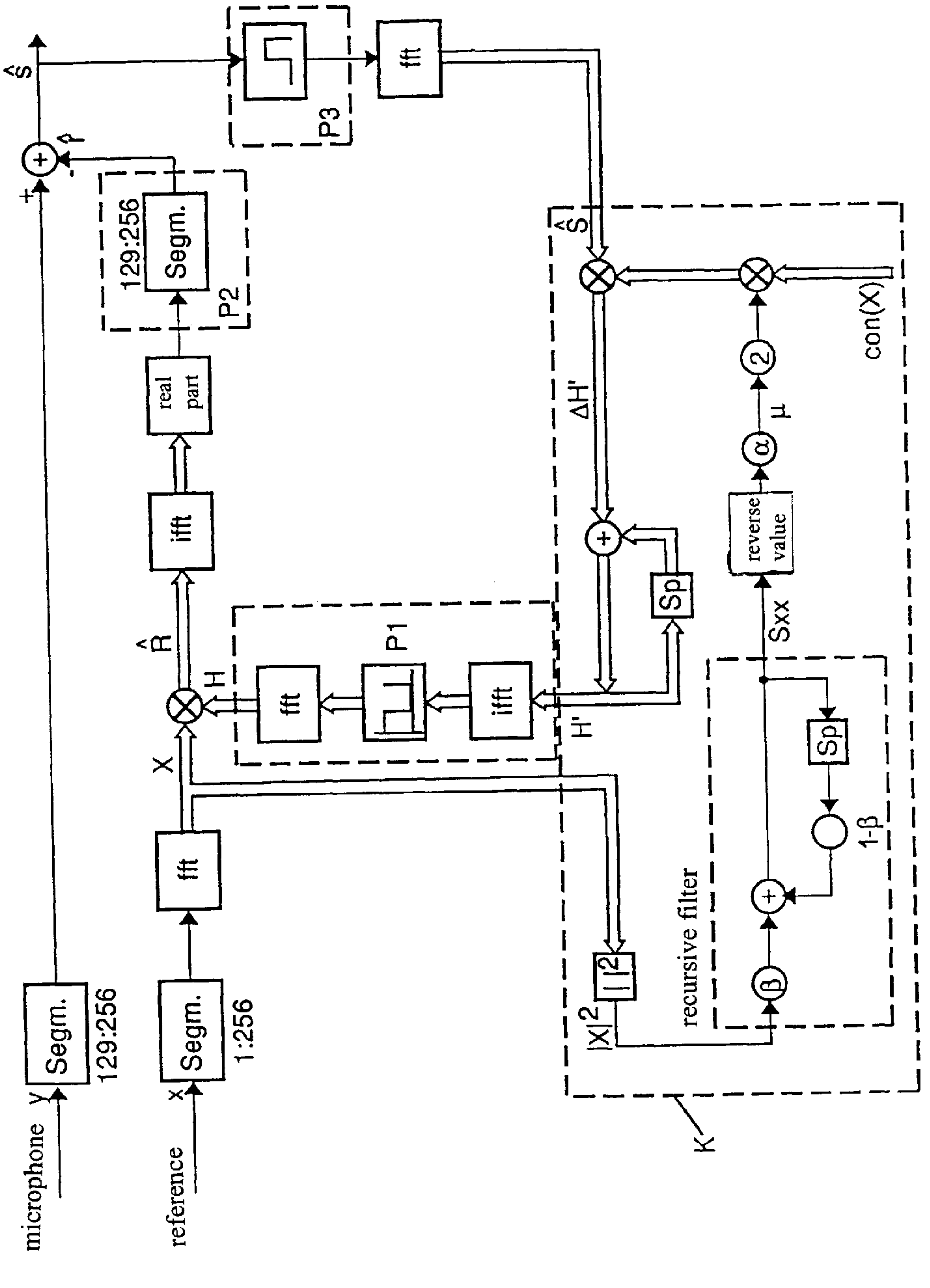
FIG. 3 is a block circuit diagram of a detailed example of FIG. 2*b*.

A detailed block diagram of the FLMS algorithm shown in FIG. 2*b* is shown in FIG. 3. The scanning values for a signal and the FFT support locations are customarily referred to as samples. All spectral transformations and their inverse values must be segmented as 256-point FFT's, which respectively overlap by 128 samples. It must be taken into account here that the output signal $\hat{s}$ is composed of 128 sample blocks in the time domain. This output signal is generated from the difference between the second block halves (that is respectively the samples 129 to 256) of the microphone signal and the filtered compensation signal $\hat{r}$. The projection P1 is very involved and requires 2 FFT's to convert the vector H' to the vector H. In the process, the first half (samples 1 to 128) is segmented from the complex 256-point result vector of the transformation back from the frequency to the time range (IFFT), and the second half (samples 129 to 256) is set equal to zero. Following the application of this rectangular window in the time domain, the transformation back to the frequency domain occurs again via FFT. The projection P2 is simple. As described in the above, it consists of segmenting the last 128 samples, thereby again creating non-overlapping 128-sample blocks from overlapping 256-sample blocks. Finally, the projection P3 is also very simple because it conversely creates again overlapping 256-sample blocks from the non-overlapping 128 sample blocks of the output signal by placing 128 zeros in front. The adaptation of the filter coefficient $H'_{L+1}$ for a cycle L+1 consists of adding a recursive vector $\Delta H'_L$ to the old coefficient vector $H'_L$. This recursion is computed from the product between the spectrum $\hat{S}_L$ of the output signal and the conjugated complex spectrum $X^*_L$ of the reference signal—weighted with a spectral capacity normalization $2\mu_L$, $\Delta H'_L=2\mu_L\cdot X^*_L\cdot\hat{S}_L$. For the purpose of this capacity normalization, the reverse value of the smoothed reference capacity spectrum $S_{xx,L}$, multiplied with a constant $2\alpha$, must be computed as $2\mu_L=2\alpha/S_{xx,L}$. A recursive filter of the first order and having a constant $\beta$ is used for this:

$$S_{xx,L}=\beta\cdot|X_L|^2+(1-\beta)\cdot S_{xx,L-1}.$$

The operational mode of the LMS algorithm is influenced considerably by the adaptation constant $\alpha$ and the smoothing constant $\beta$. Intermediate memories in recursive loops are given the reference Sp.

Figure 4A:
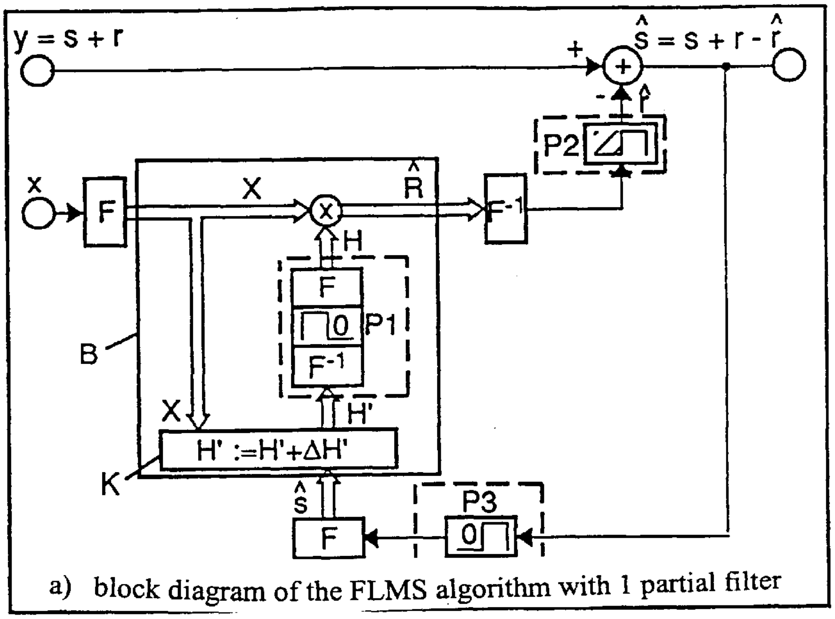
FIGS. 4*a* and 4*b* show examples of an expansion to several partial filters.
Figure 4B:
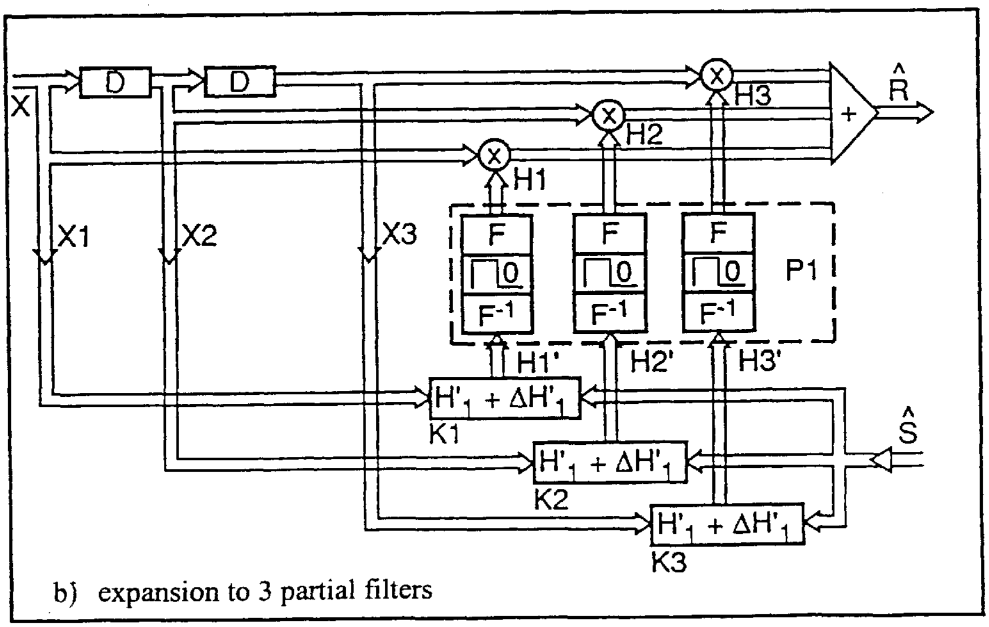

The above described arrangement of the FLMS algorithm permits filter simulations with a maximum pulse response length of half a FFT length, that is to say 128 samples in this example. If longer pulse responses must be compensated, then the known FLMS algorithm for a partial filter (FIG. 4*a*) must be expanded to n partial filters. A solution with 3 partial filters and a pulse response length of 3·128=384 samples has proven effective for the radio signal suppression in a motor vehicle having a voice input system (FIG. 4*b*). The block referred to as B in FIG. 4*a*, with the input signals X and $\hat{S}$ and the compensation spectrum $\hat{R}$ as output, is to be replaced by the expansion shown in FIG. 4*b*. The reference signal spectrum X is delayed by 1 or 2 block lengths through intermediate or temporary memories D, and the non-delayed X1 spectrum, as well as the two delayed spectra X2, X3, are multiplied separately with the coefficient vectors H1, H2, H3, determined separately in an expanded projection P1. The coefficient vectors are formed in the same way as for only one partial filter, wherein the associated reference spectrum is respectively linked in K1, K2, K3 with the spectrum $\hat{S}$ of the output signal. The expenditure is increased considerably, primarily because the projection P1 is tripled. Additional memory space is needed to provide the spectra of the older reference signal X, which is time-delayed by 1 or 2 block lengths.

Figure 5A:
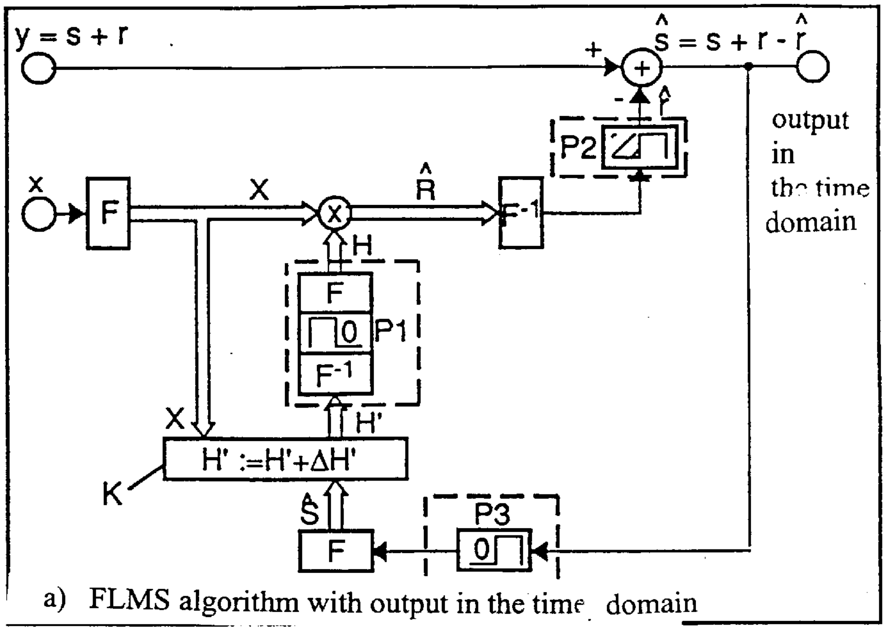
FIGS. 5*a* and 5*b* illustrate the changeover to compensation in the frequency domain.
Figure 5B:
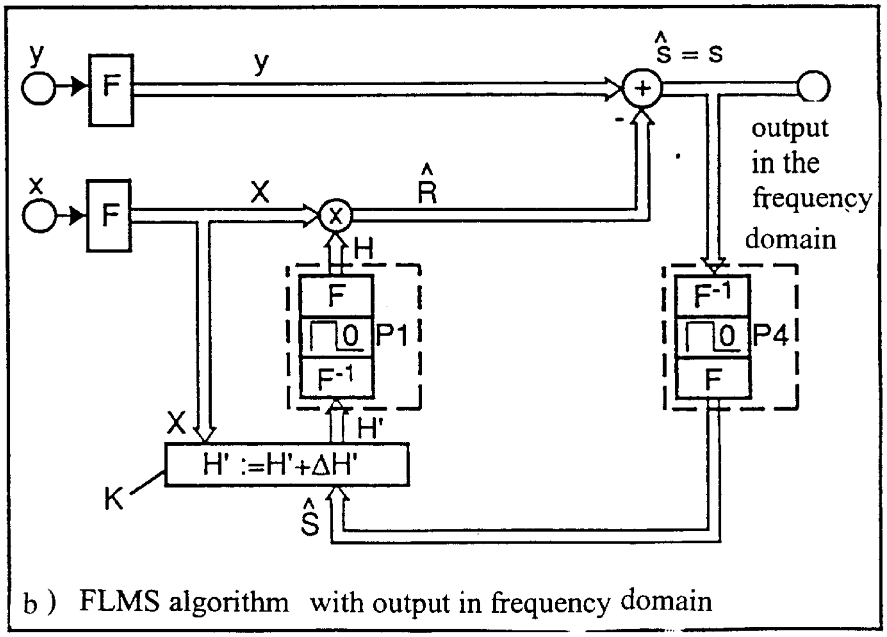

Given the exemplary problem definition of suppressing the radio signal during the voice input in a motor vehicle, it is advantageous if the output data are provided not in the time domain, but in the frequency domain, since this permits an easier adaptation to a subsequently connected noise suppression. According to FIG. 5*a*, the previously introduced FLMS algorithm with a partial filter requires a total of 5 FFT's for an output signal in the time domain. If a FFT is connected in series after the output, the expenditure increases to 6 FFT's for a frequency domain output signal. The same number of FFT's initially also results in an equivalent solution according to FIG. 5*b*. However, this variant has the following advantages:

A spectral analysis of the signals x and y, occurring at the same time, requires only a single 256-point FFT with low additional expenditure for a spectral separation, thereby resulting in a saving of 1 FFT.

The newly defined projection, characterized with P4 herein, is identical to the projection P1, with the exception of the time window used. As will be shown later on, P4 can be replaced by a relatively simple convolution operation in the frequency domain, without this resulting in a noticeable loss of quality. A saving of 2 FFT's can be achieved.

Figure 6:
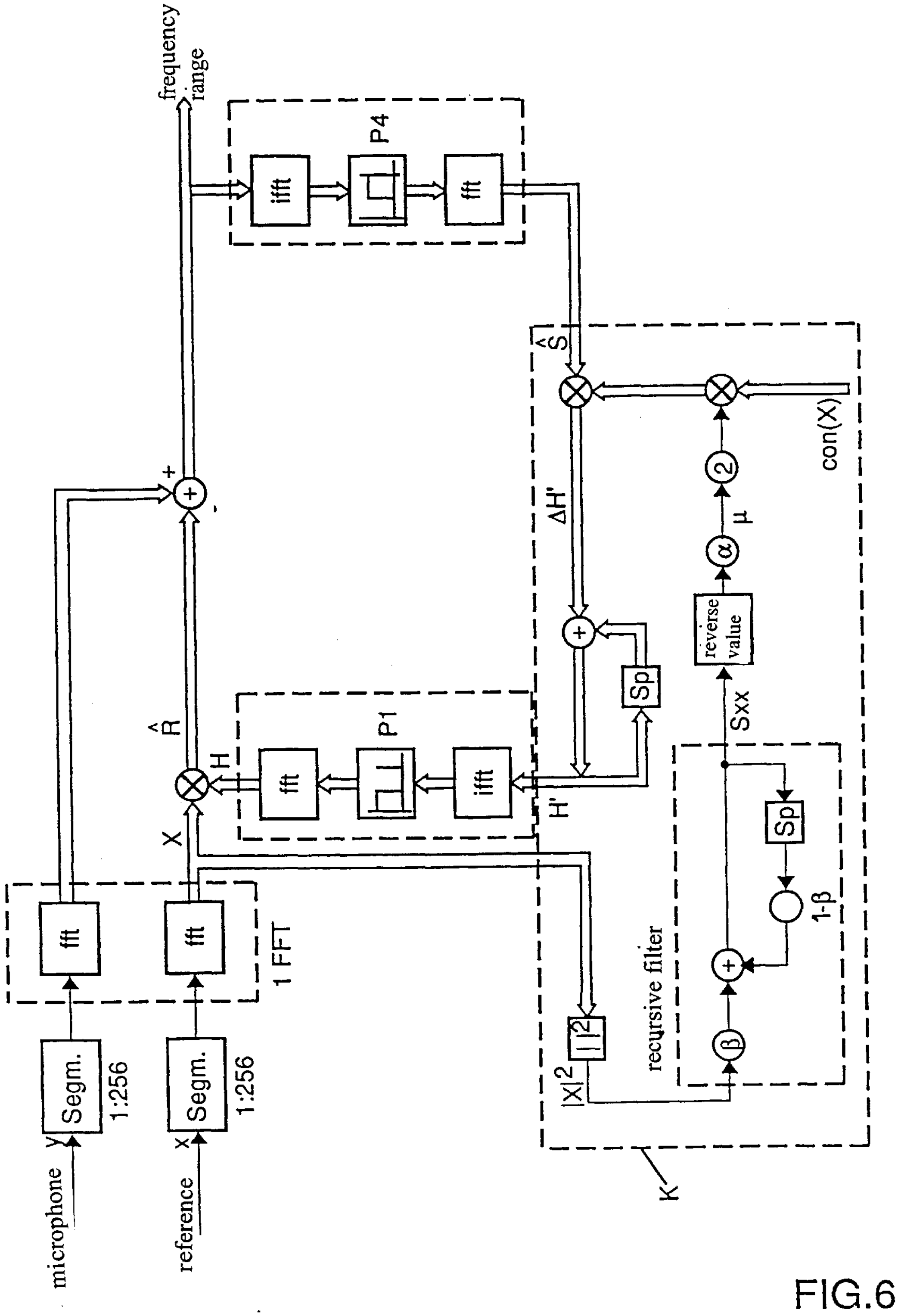
FIG. 6 is a block diagram of a detailed example of the arrangement of FIG. 5*b* showing compensation in the frequency domain.

FIG. 6 represents a more detailed block diagram of the FLMS algorithm with a $\hat{f}$frequency $\hat{R}$ domain output signal and again permits a comparison with FIG. 3 (time domain output). The filtering adaptation, which consists of smoothing the spectral capacity, capacity normalization and coefficient recursion, has remained unchanged. New here is the FFT in the microphone channel, generating of an output by forming of the difference $Y-\hat{R}$ in the frequency domain instead of the time domain, and finally the newly defined projection P4, which differs from the projection P1 only in that it has a complementary time domain window.

Figure 7:
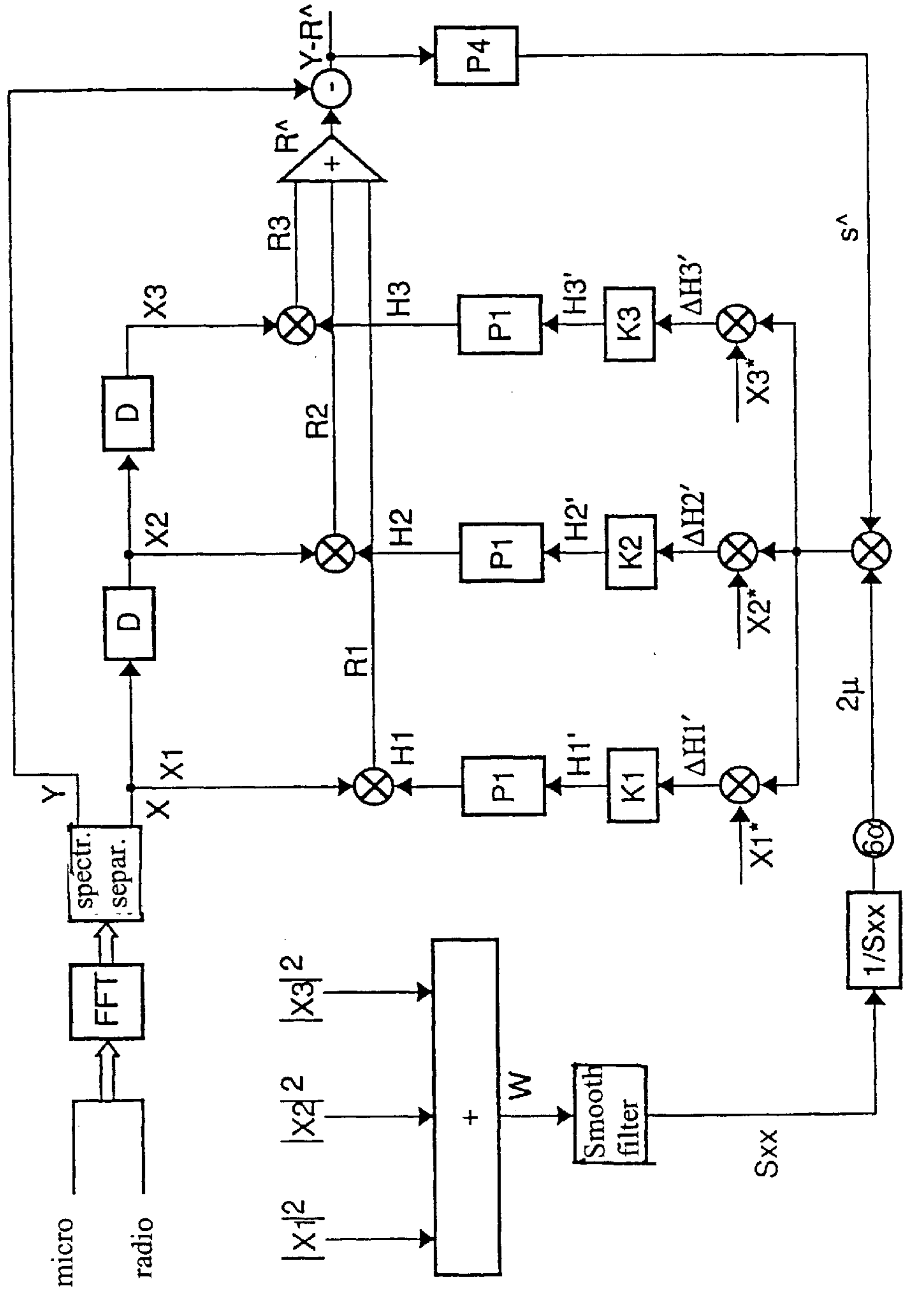
FIG. 7 is a block diagram of an exemplary embodiment with several partial filters.

FIG. 7 must be viewed as a preliminary stage for a preferred embodiment, described in the following. The FLMS algorithm with 3 partial filters (384 sample pulse response) is shown, which delivers a sufficient suppression of the radio signal in the microphone channel of the voice input system. Simplified versions of the projections P1 and P4 are shown here. The additional expenditure in the form of memories P, which is known from FIG. 4*b*, as well as the tripling of the projection P1 can be seen. In contrast to the solution with 1 partial filter according to FIG. 6, the sum W formed from the present capacity spectrum and the two, preceding reference capacity spectra, is applied to the input of the recursive filter. The fact that practically three times the smoothed spectral capacity is now present at the filter output is taken into account, following the reciprocal value formation, through a multiplication with the constant $6\alpha$. Following the spectral capacity normalization of the output spectrum $\hat{S}$, modified in P4, the filter adaptation is executed separately for the 3 coefficient vectors of the 3 partial filters.

Figure 9:
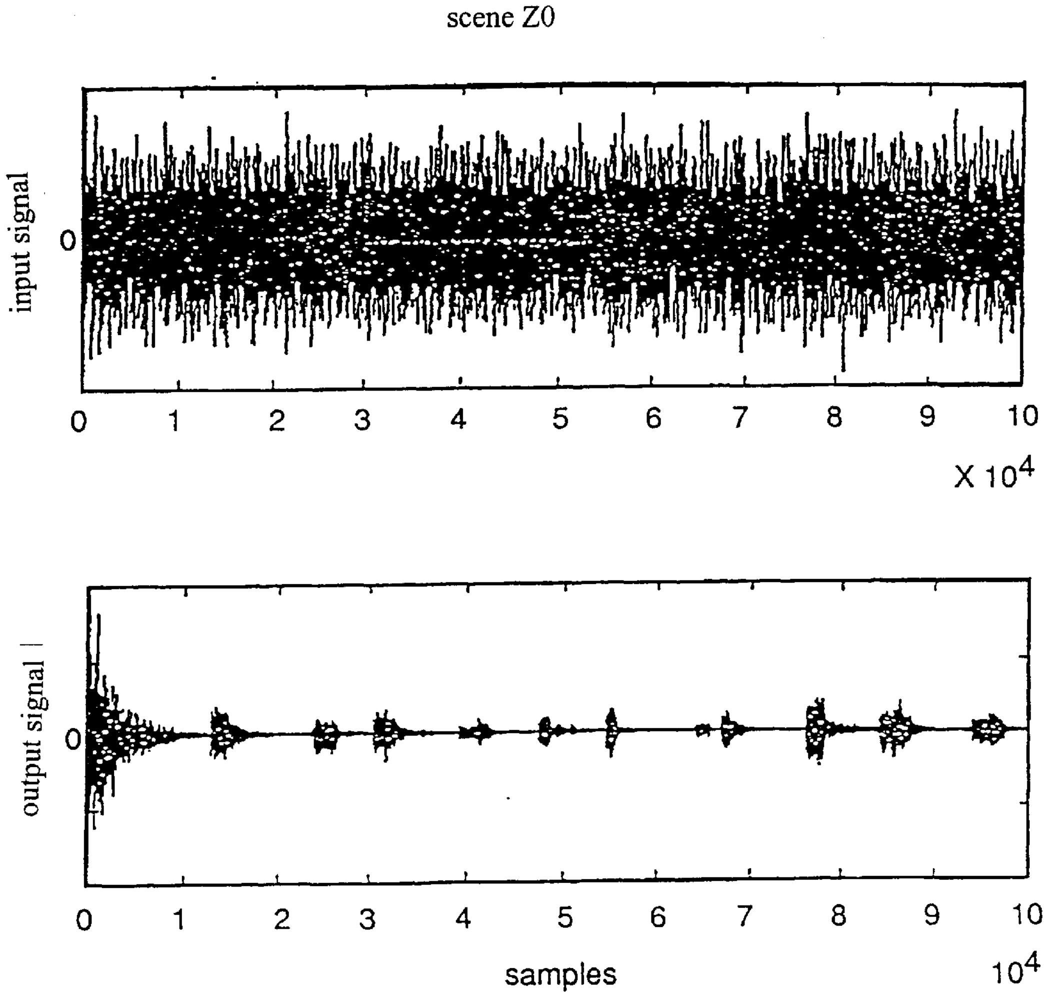
FIG. 9 shows the input and output signals from an artificially created exemplary scene.
Figure 10:
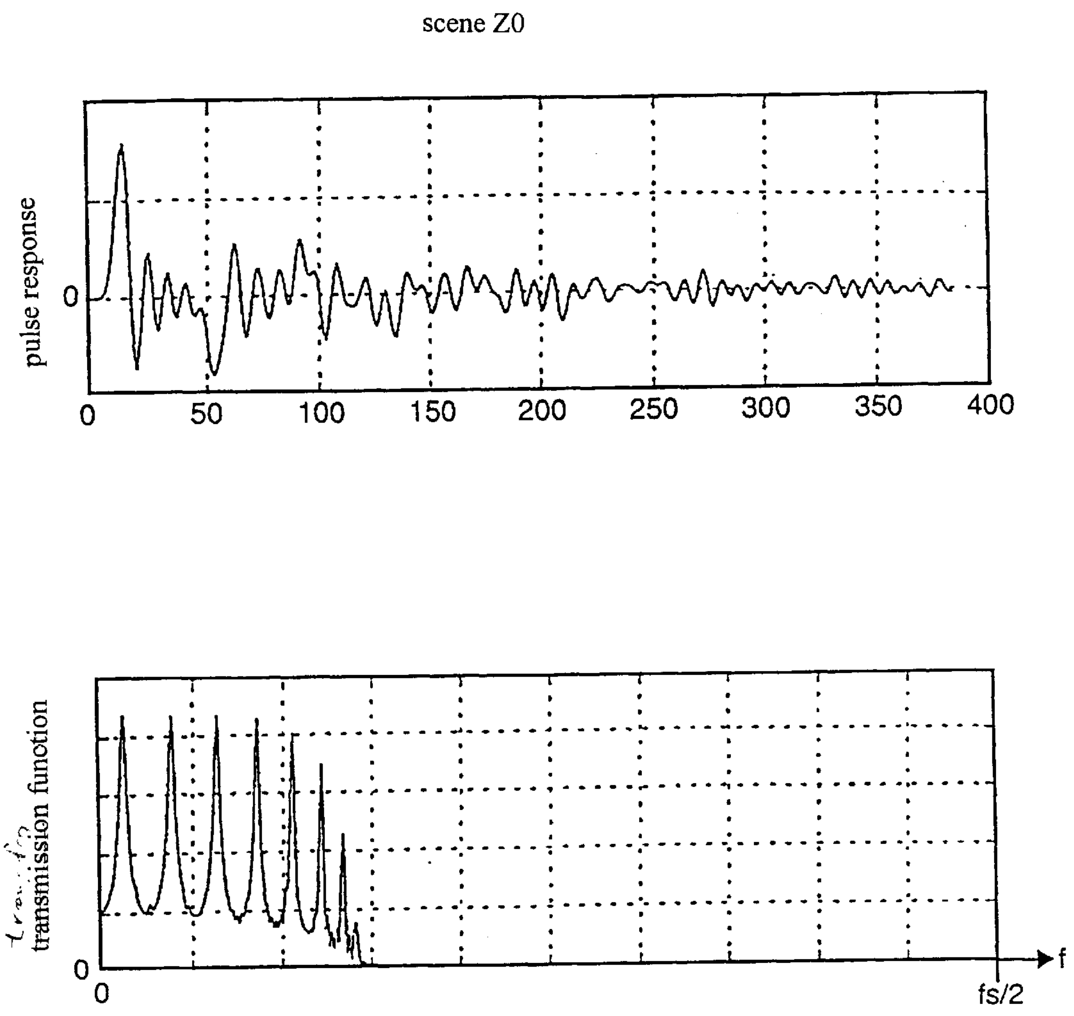
FIG. 10 shows the pulse response and the transfer function corresponding to the signals of FIG. 9.

The operational mode of the invention according to FIG. 7 is shown in FIG. 9 with an example Z0. The input data were generated synthetically. The reference signal X represents 100 000 scanning values of a white Gauss noise with a scanning sequence frequency of fs=12 kHz. The microphone signal Y was generated through convolution of this noise signal with an also engineered 384 sample pulse response, as well as the addition of an extremely weak voice signal. When listening to this above-mentioned signal y, recorded in FIG. 9, the 10 spoken digits can just barely be detected in the colored (because filtered) noise. The output signal from the estimator, which is transformed back to the time domain, effectively frees the voice input from the noise, following a transient period lasting approximately 1 second (12000 samples), and delivers a non-distorted, but slightly faded voice signal $\hat{S}$ (bottom of FIG. 9). The following values were used as parameters: $\alpha$=0.05 and $\beta$=0.5, which have also proven effective for the examples presented later on. It is thus possible at any point in time to compute the resulting 3*128 sample pulse response or the associated filter transfer function from the respectively 129-sample long partial coefficient vectors H1, H2, H3 of the 3 partial filters according to FIG. 7. Thus, the 384 sample pulse response at-the end of the scene, that is to say after the digit "0" is spoken, is shown at the top in FIG. 10. It represents an exact image of the pulse response used for the convolution with white Gauss noise and thus for the synthetic generating of the microphone signal. The associated value transfer function (bottom of FIG. 10) in the range between the frequencies 0 and fs/2=6 kHz, represents a low-pass frequency response that is encumbered with numerous, narrow-band resonance rises.

When trying to find a simulation of this filter within the meaning of the problem definition, white noise as the reference input signal and filtered "colored" noise as the microphone input signal represent the simplest case. Since the reference signal by definition contains all frequency components, it is the quickest way to obtain the filter adaptation. The additional additive voice input in the microphone input signal—meaning the actual useful signal of the voice input system—represents an interference for the (F)LMS algorithm, which hinders the correct adaptation of the filtering coefficients. In other words, a correct simulation of the acoustics for the motor vehicle inside space (path from radio speaker to microphone) and thus a compensation of the radio playback is possible only during the speech pauses. This is achieved easily with the above-demonstrated example according to FIG. 9, since the microphone input essentially consists of noise and contains only a small voice input component.

Figure 11:
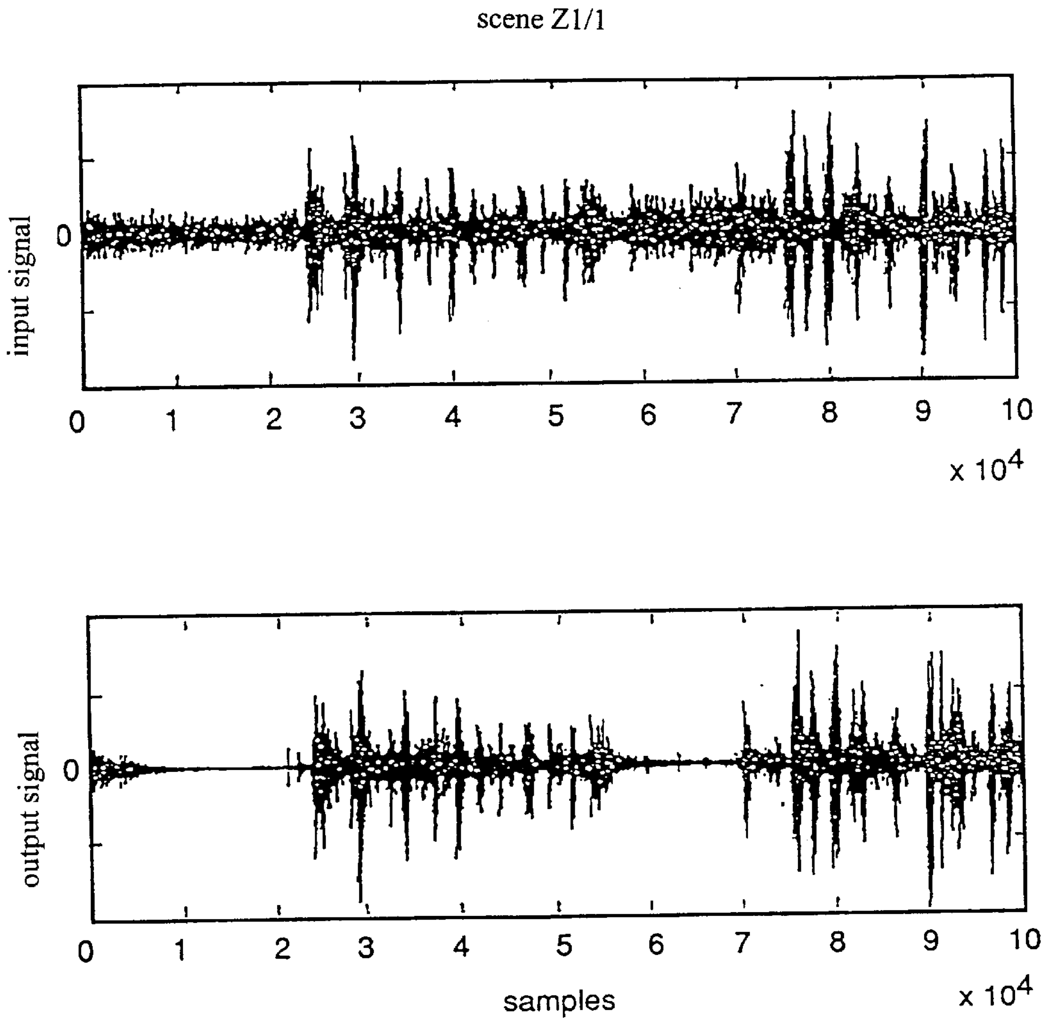
FIG. 11 shows the input and output signal for a first measuring scene.
Figure 12:
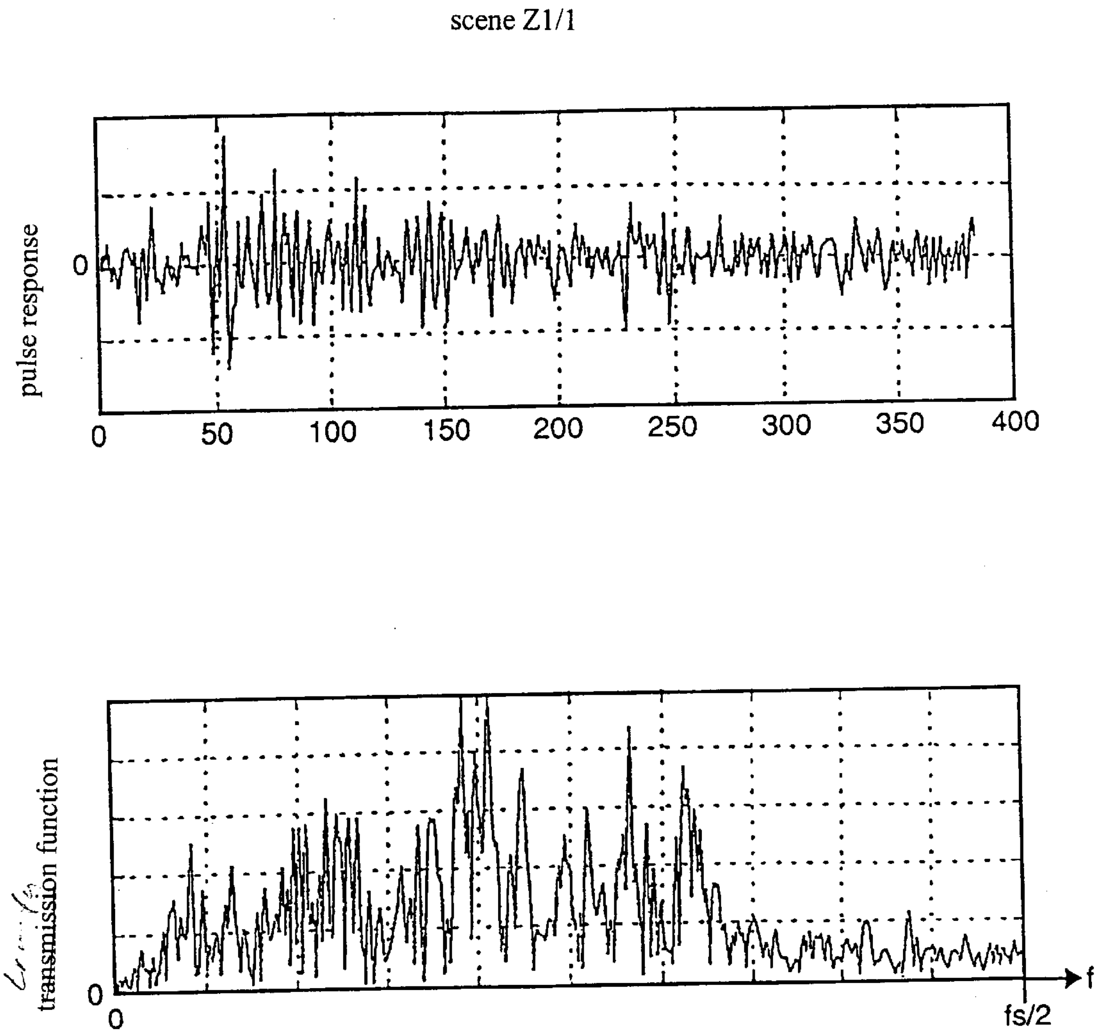
FIG. 12 shows the input pulse response and transfer function corresponding to the signals of FIG. 11.

However, the radio reference signal, tapped at the radio speaker terminals, and the microphone signal from the scene Z1, which is recorded by the voice input system microphone, are derived from actual measurements. This microphone signal is shown on the top in FIG. 11 and consists of 100 000 samples. Consequently, it has a duration in time of approximately 8.3 seconds for a sampling frequency of 12 kHz. This concerns words spoken fluidly and relatively rapidly by a passenger, sitting in the right rear of the motor vehicle while music is coming at the same time and with a normal loudness level from the car radio speaker. Following the use of interference elimination measures according to FIG. 7 and a conversion to the time domain, the output-signal results, which is shown in FIG. 11, on the bottom. The hearing test shows that there is a clear emphasis on the voice component or a suppression of the music component, which is noticeable in particular during the short speech pauses. However, the fact that the desired radio signal suppression depends to a high degree on whether or not words are spoken at the time is very noticeable and represents a disadvantage. FIG. 12 shows the 384 sample pulse response with associated transfer function, which is again determined at the end of the scene. A correct pulse response can be recognized by the typical zero samples (dead time) at the beginning, which result from the direct transit time of the sound from the radio speaker to the microphone. Based on the strong interference, present here at the beginning and end of the pulse response, the conclusion must consequently be reached that the filter adaptation is highly deficient at this location because a voice input exists.

Figure 8:
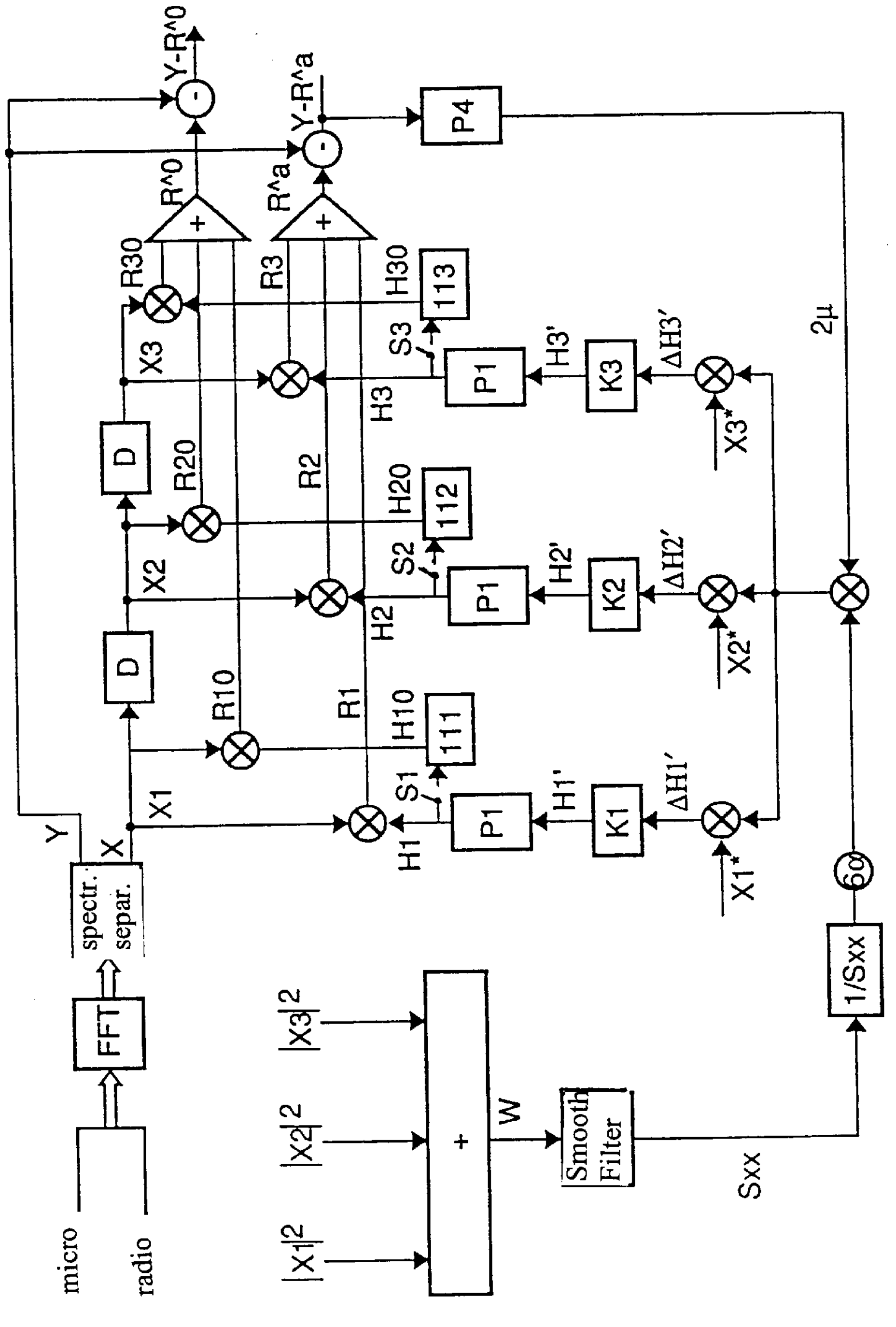
FIG. 8 is a block diagram of an exemplary embodiment with storage of the filter settings.

The embodiment described later on with the aid of FIG. 8 is based on the following basic idea: a suitable characteristic, together with a threshold value, serves as indicator for a voice input. If the characteristic falls below the threshold value, then this indicates a missing voice input. A filter adaptation that is mostly free of interference can occur in that case, as already mentioned in the above. If a voice input occurs, the set of filtering coefficients used is the set stored just prior to exceeding the threshold value, meaning at the end of the preceding speech pause. These previously stored coefficients H10, H20, H30 normally provide a noticeably better radio signal compensation than the coefficients H1, H2, H3, which change constantly under the interfering influence of the voice input.

FIG. 8 represents an embodiment with further improved FLMS processing with 3 partial filters. In addition to the actual filtering coefficient vectors H1, H2, H3, which already exist in FIG. 7 and are needed to generate the continuously adapted output signal y-R, there is also an additional output signal (y-Ro), which is generated by using the stored coefficients H10, H20, H30. The actual coefficient sets H1, H2, H3 represent a usable compensation filter in the frequency domain only if there is no voice input in the balanced state. In case of a voice input, they provide insufficient filtering qualities because the adaptation process in the control loop is constantly interfered with. If there is no voice input, meaning high filtering quality, the three switching circuits are closed and the actual coefficient sets are recorded in the coefficient memories M1, M2, M3: H10=H1, H20=H2, H30=H3. The outputs (y-Ro) and (y-Ra) are identical. If a voice input starts, this will cause the 3 switching circuits to open up, as a result of which the coefficients H10, H20, H30, stored last in the memories M1, M2, M3, are not longer recorded over and remain unchanged. This condition, in which the outputs (Y-Ro) and (Y-Ra) are different, is maintained until another speech pause is detected and the switching circuits are closed.

Figure 8A:
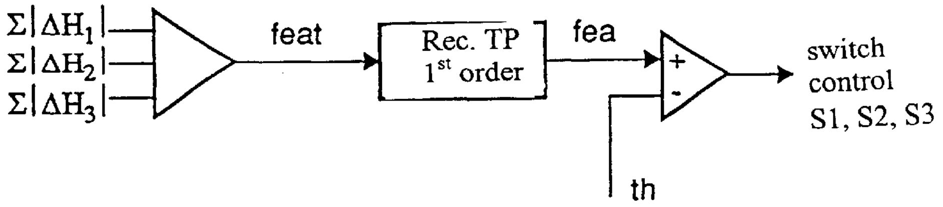
FIG. 8*a* is a block diagram illustrating a control circuit for the filter settings.

The smoothed sum of all absolute values for the coefficient correction vectors ΔH1', ΔH2', ΔH3' has proven effective (FIG. 8*a*) as the speech pause characteristic fea. This quantity is equal to zero or has small numerical values if there is no need or only a small need for changing the coefficients. That is the case during speech pauses because the control circuit is practically in a steady or balanced state. Interference such as can be caused by a voice input—but also by movement of the vehicle passengers—results in an increased need for readjustment, which makes itself known through correspondingly high numerical values for ΔH1', ΔH2', ΔH3' and thus shows up in the characteristic fea. A smoothing filter, e.g., a recursive low-pass filter (Rec. TP) of the $1^{st}$ order with the input feat, provides the smoothed speech-pause characteristic fea at its output, which controls the circuits for the coefficient takeover, following a comparison with a threshold value th.

Figure 13:
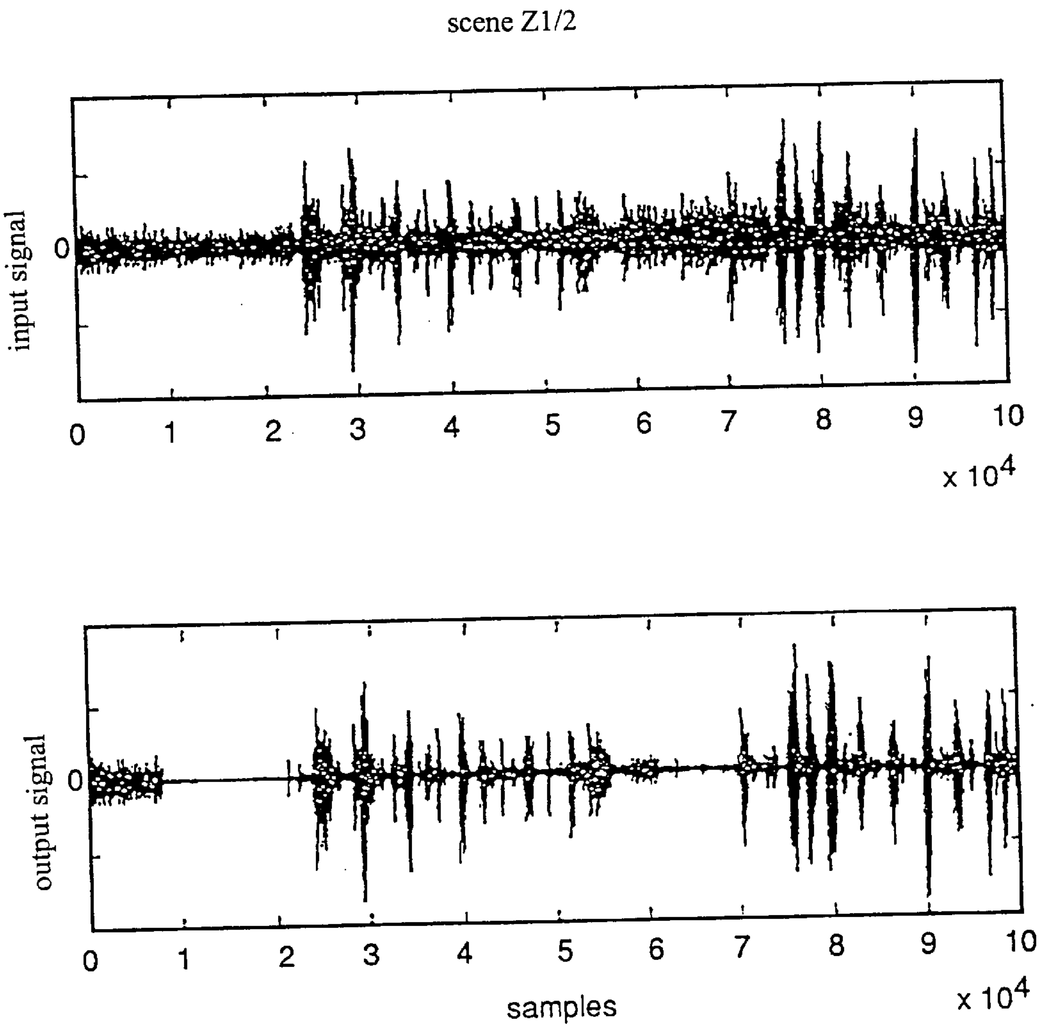
FIG. 13 shows the input and output signals for the example according to FIG. 11 c with storage of the filter settings.
Figure 14:
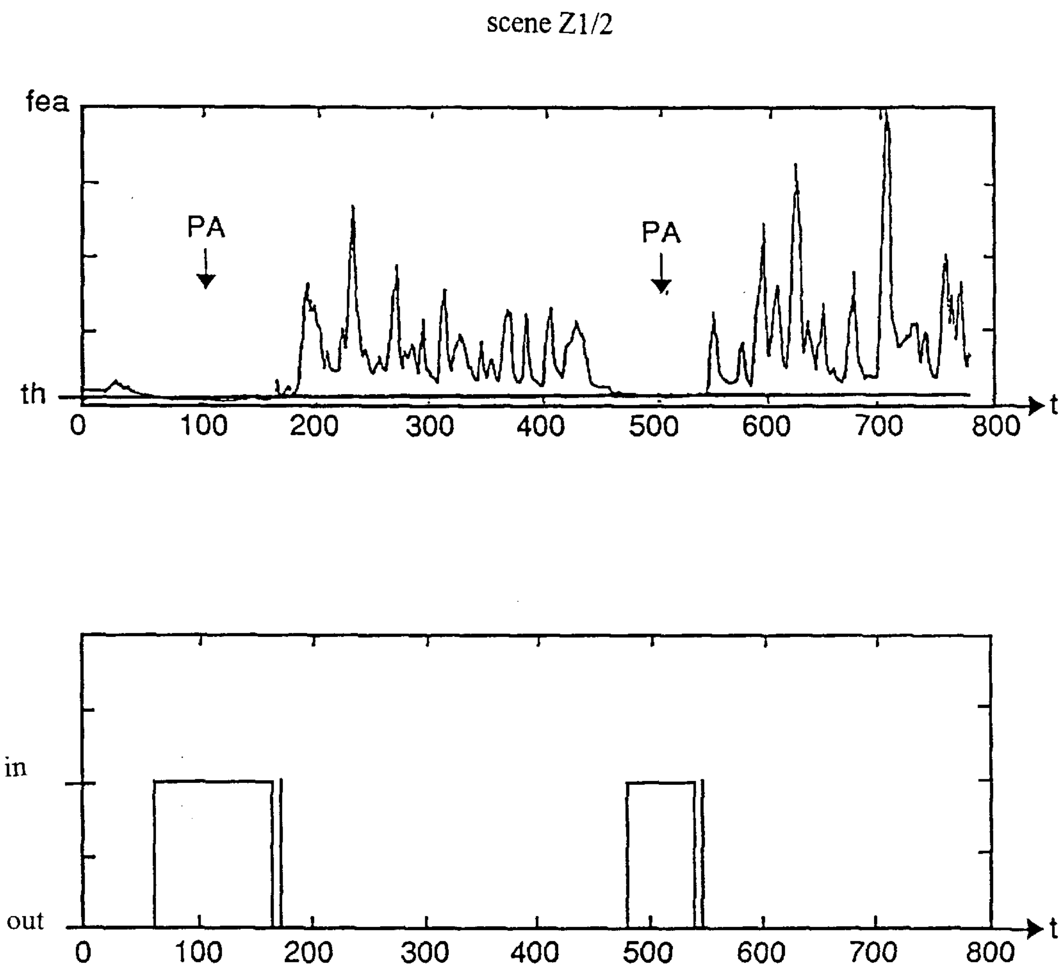
FIG. 14 shows the signals for detection of a speech pause for the example FIG. 13.
Figure 15:
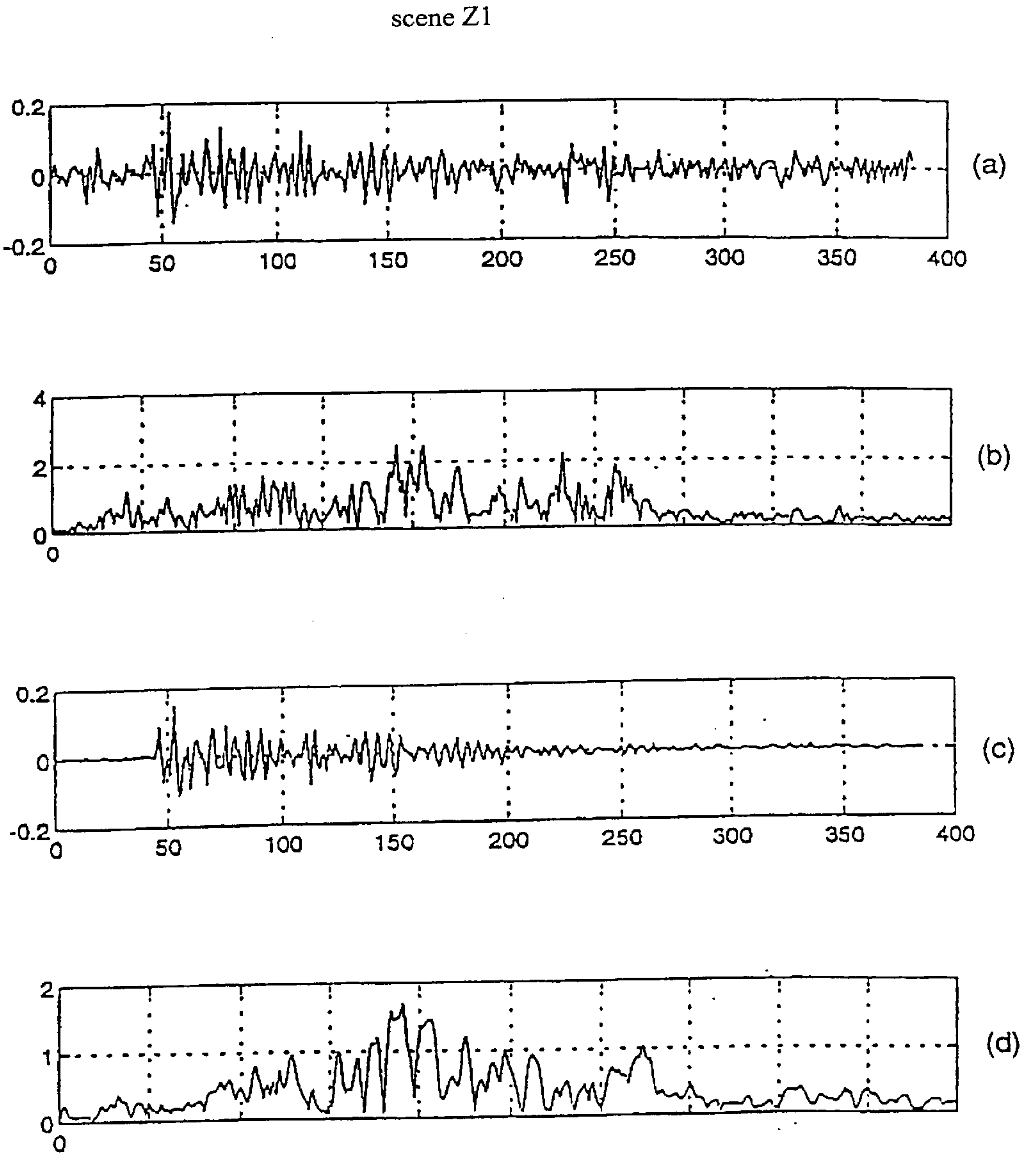
FIG. 15 shows the pulse responses and transfer functions corresponding to the examples of FIGS. 11 and 13.

FIG. 13 demonstrates the mode of operation of the improved FLMS algorithm according to FIG. 8. The recorded signal y for the scene Z1 (compare FIG. 11 on the top) is shown on the top whereas the obtained output signal is shown on the bottom. Even the visual comparison of the output signals in FIG. 13 and FIG. 11 shows that the speech passages are more emphasized. The hearing test for comparison confirms this: the music suppression is clearly improved, even during the voice input. The course of the speech pause characteristic and of the constant threshold over time (here scaled in FFT blocks) is shown in FIG. 14 on the top. In the speech pauses (FIG. 14 bottom), which are detected as a result of falling below the threshold value, the coefficients are constantly entered into the memory, so that they are available during the voice input as stored coefficients. The 384 sample pulse response with the associated amount transfer function, which is measured at the end of the scene in FIG. 12 already, is shown in FIG. 15 as actual pulse response (a) or actual transmission function (b). In contrast to this estimation, obtained from the actual coeffi cients H1, H2, H3, which is strongly distorted as a result of the voice input, a pulse response (c) and a transfer function (d) with high quality can be computed from the stored coefficients H10, H20, H30. The pulse response from the stored coefficients has the typical zero samples at the beginning, which are caused by the transit time for the direct sound from the radio speaker to the voice input microphone. The distance between loudspeaker and microphone can be determined from the dead time of approximately 40 samples, which must be read off in the exemplary case.

Figure 16:
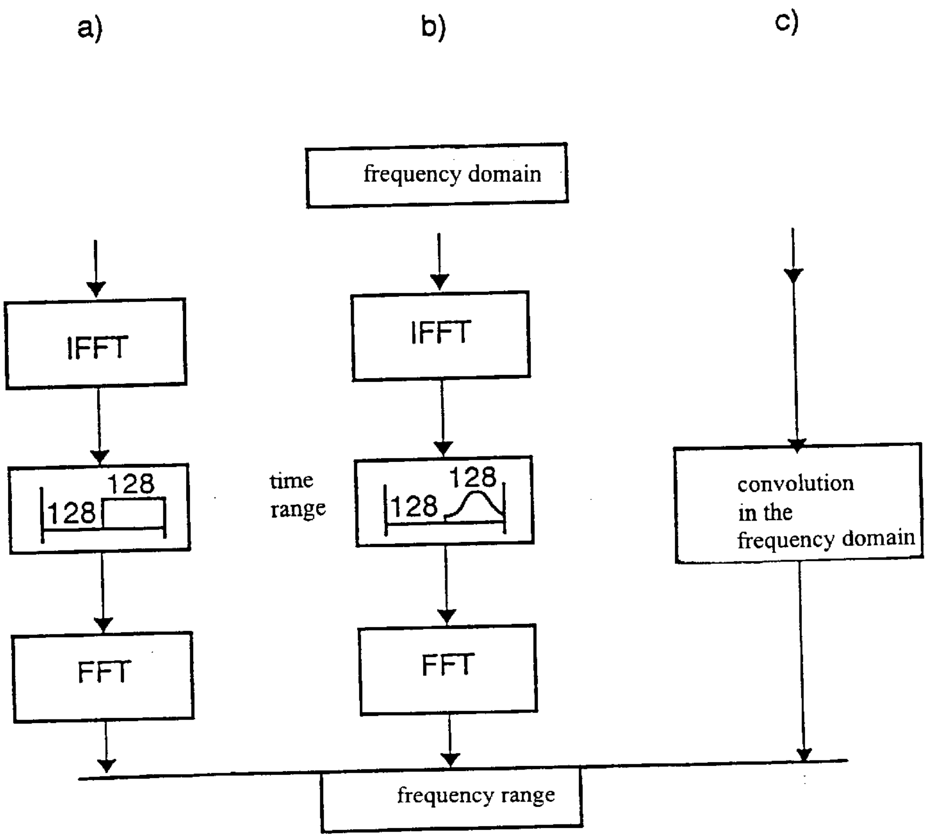
FIG. 16 illustrates a changeover from a time window to a convolution in the frequency or domain.
Figure 17:
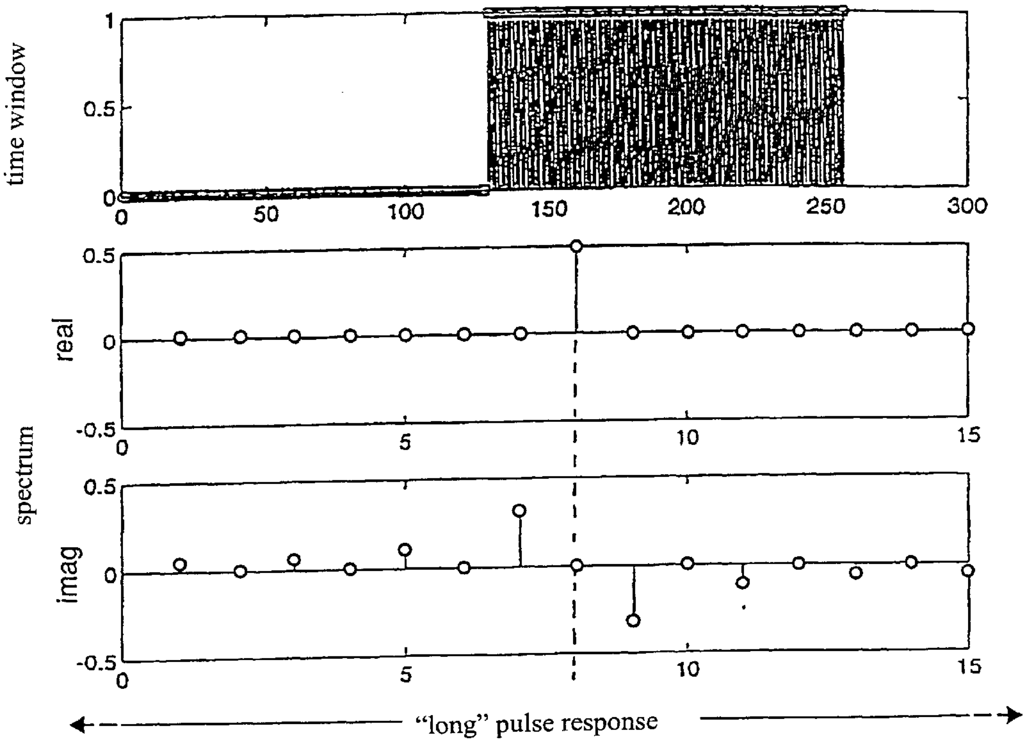
FIG. 17 illustrates a rectangular time window with line spectrum.
Figure 18:
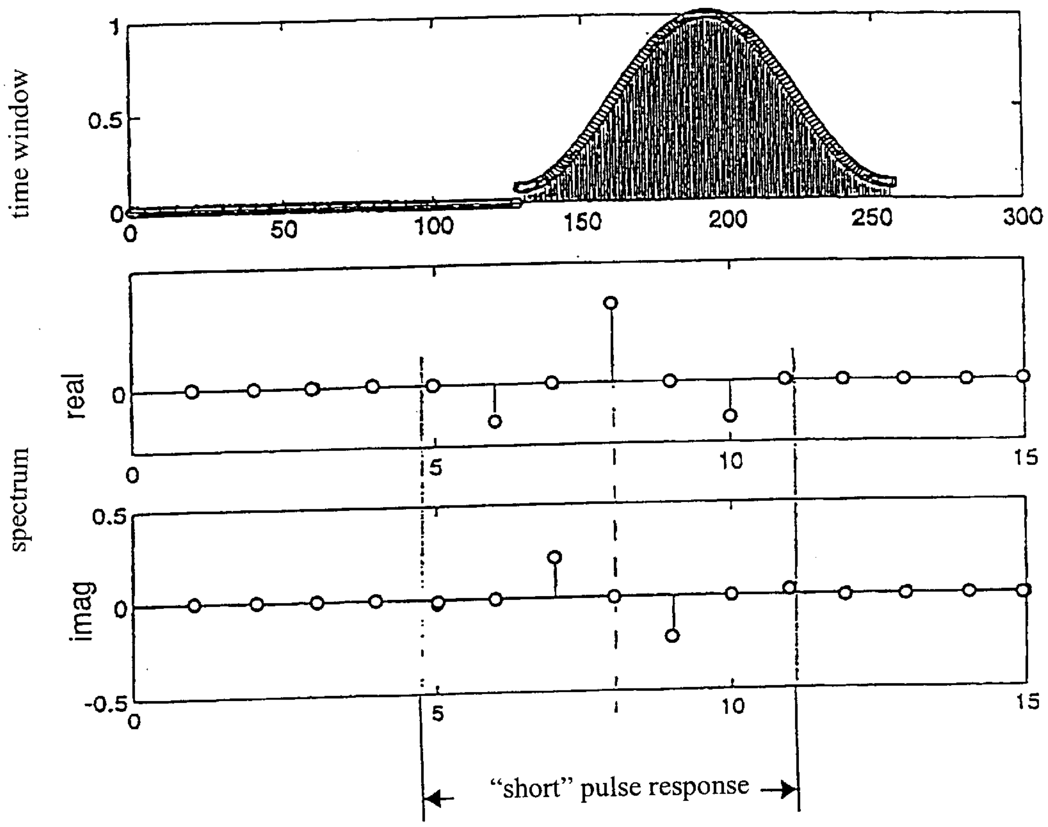
FIG. 18 illustrates a hamming time window with line spectrum.

As previously indicated in the above, the involved projection P4 (IFFT, right window in the time range, FFT) can be replaced without noticeable loss in quality with a relatively simple convolution in the frequency domain, as a result of which 2 FFT's become unnecessary. Please see FIG. 16 with respect to this. The 128 sample rectangular window on the "right side" in the time domain (FIG. 16*a*) is replaced in a first step during the ideal projection by a 128 sample Hamming window (FIG. 18*b*). In contrast to the rectangular window, this window has the advantage of a much smaller spectrum. As shown in FIG. 17, the real component of the spectrum for the rectangular window consists of a single line (equal component), whereas the imaginary component spectrum that is anti-symmetrical toward the center, consists of many lines with alternating zeros, which slowly decline toward the outside. In contrast to this, the complex spectrum of the Hamming window (FIG. 18) is limited to a total of 7 lines, of which in the symmetrical real component only 3 values differ from zero and in the anti-symmetrical imaginary component only 4 values differ from zero. All components that are positioned farther outside are negligibly small. This special characteristic of the Hamming window advantageously permits replacing the multiplication in the time domain (FIG. 16*b*) with a convolution in the associated 7-sample spectrum in the frequency domain and thus makes it possible to eliminate an IFFT and a FFT (FIG. 16*c*).

Figure 19:
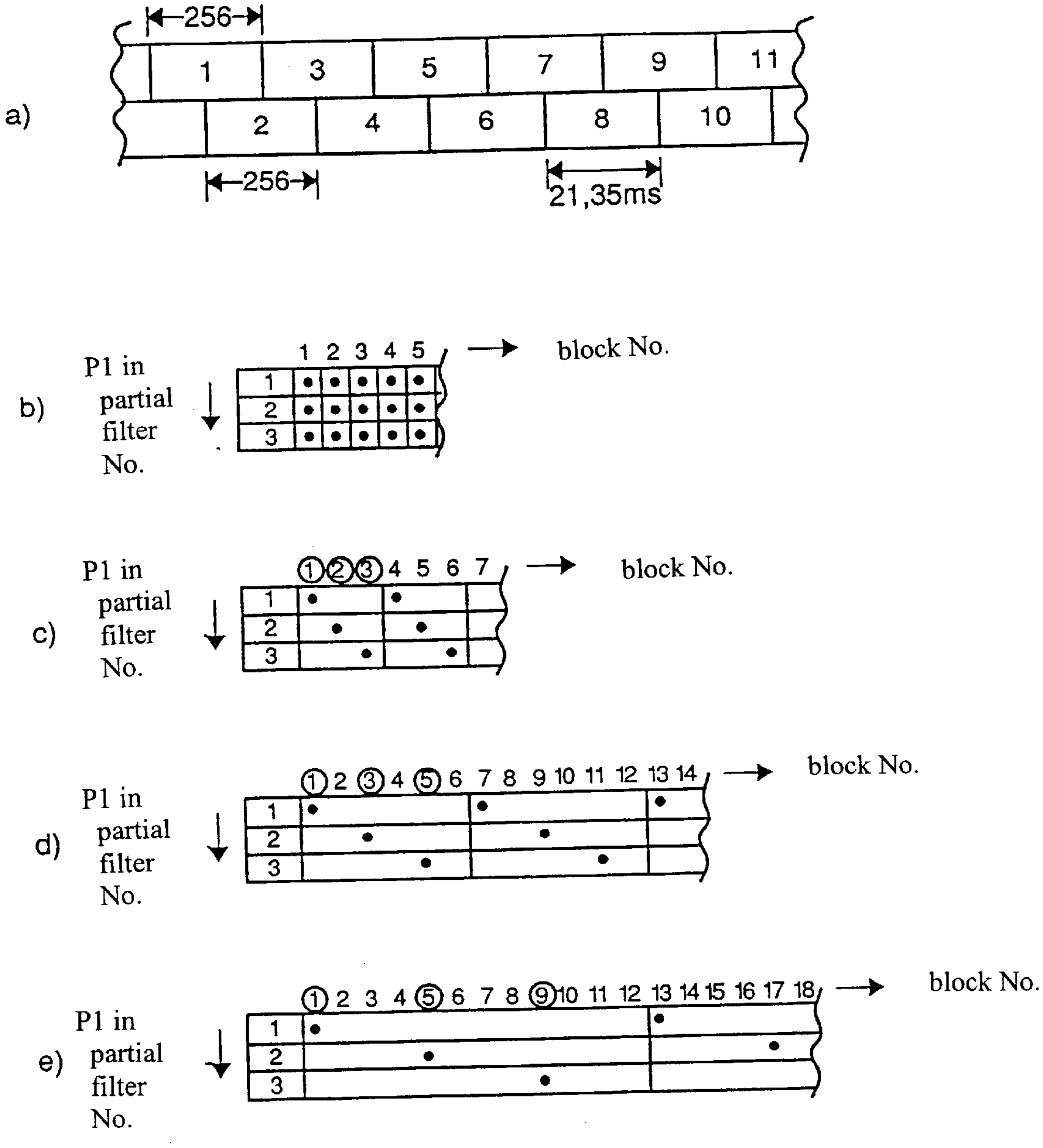
FIG. 19 illustrates the staggering of signal blocks for the filter computation.

Of course, the projection P1 (IFFT—rectangular window on the left side—FFT) can in principle also be replaced with a corresponding convolution operation in the frequency domain, with the conjugated complex 7-line spectrum. However, experiments have shown that any savings at this point are paid for with a noticeable decrease in the transient response. Solutions requiring little expenditure can nevertheless be achieved in that the 3 projections P1 in the LMS algorithm according to FIG. 8 do not have to be processed simultaneously in a 256 sample input data block. The input data blocks with length 256, which overlap with 128 samples, are sketched in FIG. 19*a* and have a numbering system that starts arbitrarily at "1." Thus, with the modulo-3 counting method for the input data blocks, it is possible, for example, to calculate the 3 partial filter projections not in parallel arranged (FIG. 19*b*), but sequentially arranged blocks as in FIG. 19. As a result of this and given the ideal projection P1, not 6 but only 2 FFT's are still necessary for each data block. It has turned out that the radio signal compensation is sufficiently functional for even larger distances selected between the partial filter projections to be computed. If using the modulo 6 counting method, for example, a projection must only be computed in each second block (FIG. 19*d*). Even a reduction to a distance of four blocks between two successive P1 calculations by means of a modulo 12 counting method still produces usable results (FIG. 19*e*).

The capacity of the FLMS algorithm with 3 partial filters, based on the block diagram in FIG. 8, and a sequential calculation of the ideal projection P1 in the time grid according to FIG. 19*e*, as well as the projection P2 by means of convolution in the frequency domain (FIG. 16*c*) with a complex 7-line spectrum (FIG. 18) is demonstrated with the aid of 3 measuring scenes.

Figure 20:
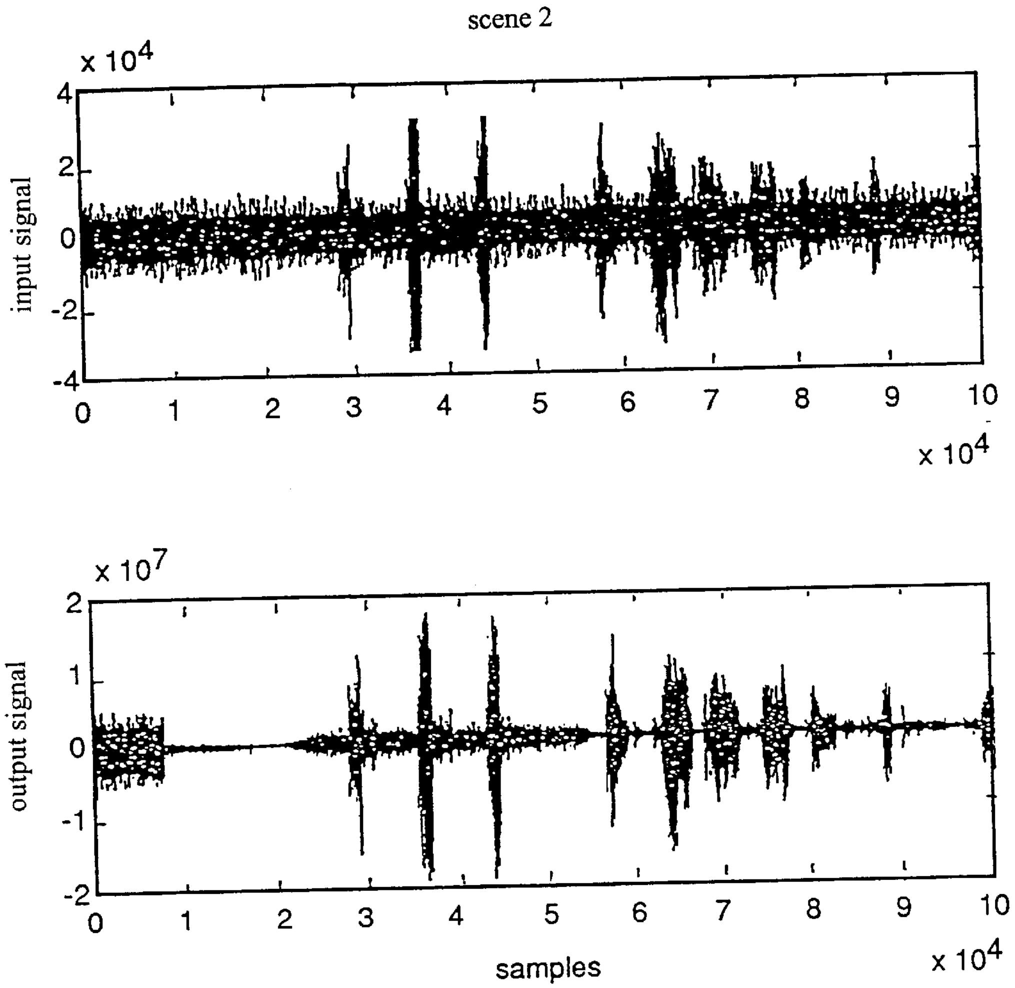
FIG. 20 shows the input and output signals from a second measuring scene.
Figure 21:
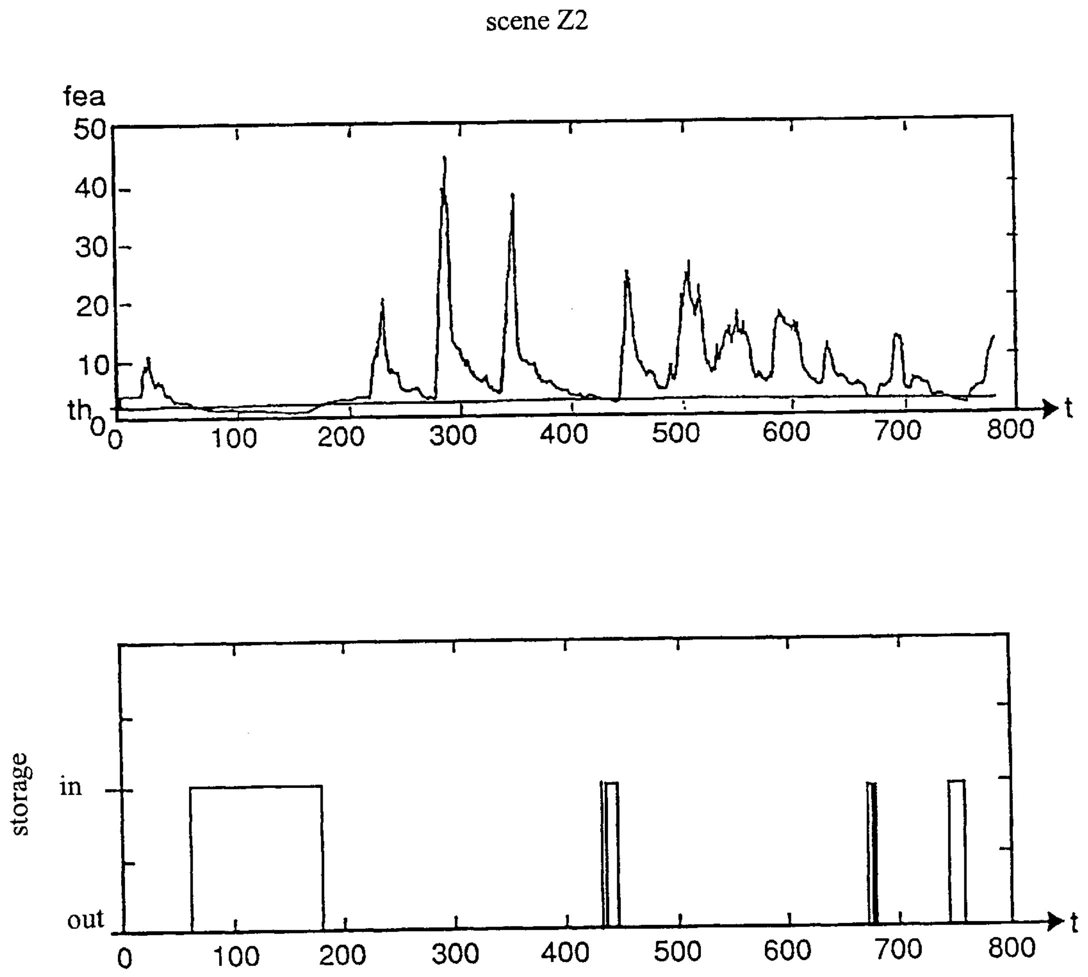
FIG. 21 shows a speech pause detection for the example of FIG. 20.
Figure 22:
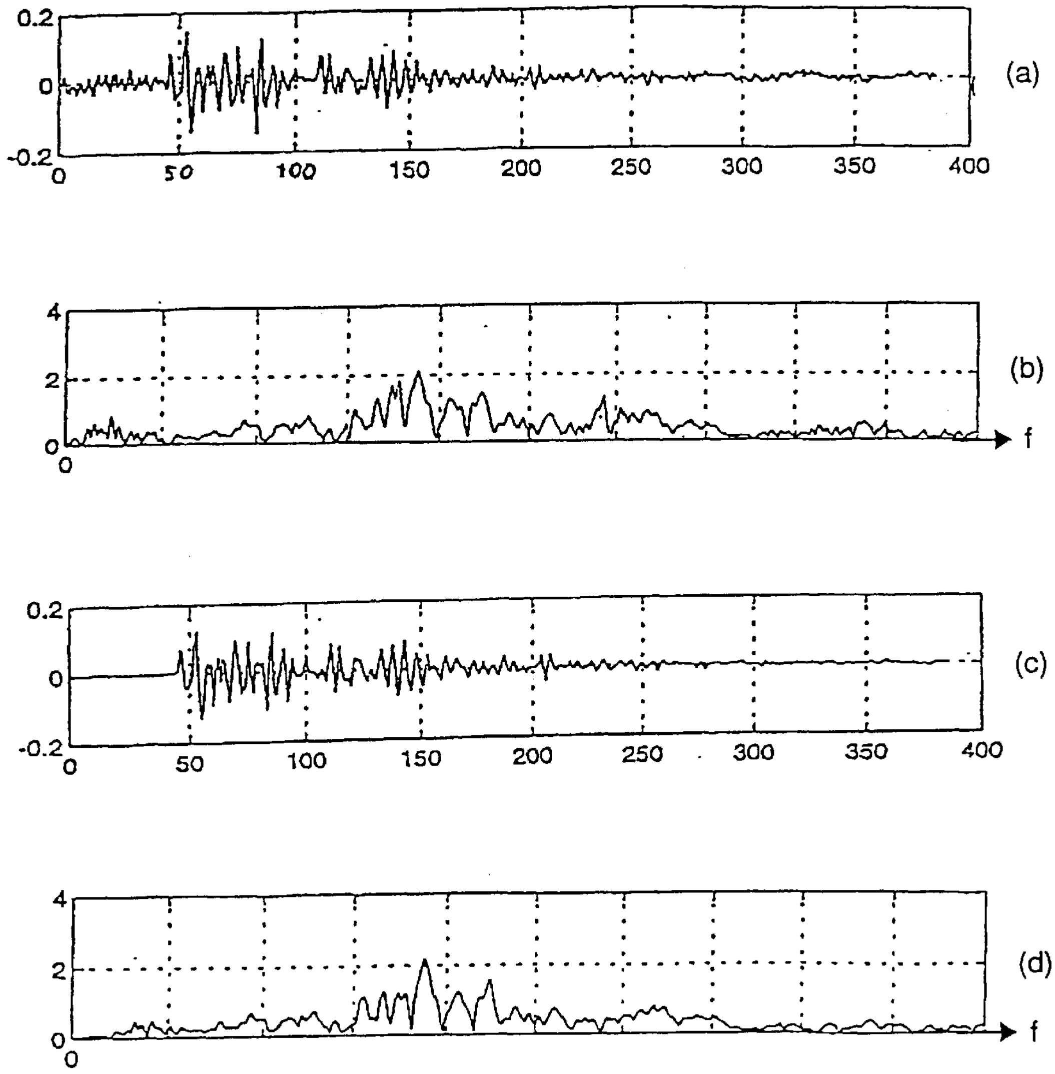
FIG. 22 shows the pulse responses and transfer functions corresponding to the example of FIGS. 20 and 21.

The first one of these scenes Z2 contains the voice input of digits, wherein the radio speaker radiates nearly white noise with relatively high noise intensity. The associated 100 000 sample microphone signal is shown on the top in FIG. 20, the extracted output signal is shown in FIG. 20 on the bottom. A noticeable elimination of noise from the output signal as compared to the microphone input can be detected during a hearing comparison. The time-dependent course of the speech pause characteristic, together with the constant threshold th, is shown in FIG. 21 on the top, and the speech pauses or the associated circuit positions, derived from this, are shown in FIG. 21 on the bottom. Analogous to FIG. 15, FIG. 22 finally illustrates the pulse response (a) and the transfer function (b), detected at the end of the scene, on the basis of the actual coefficients and shows the corresponding variables (c), (d) on the basis of the speech pause adjustment. It is clearly visible that the actual pulse response detected at the end of the scene represents a result with interference due to a voice input, whereas the pulse response from the stored coefficient sets, stemming from the last speech pause, has a high quality.

Figure 23:
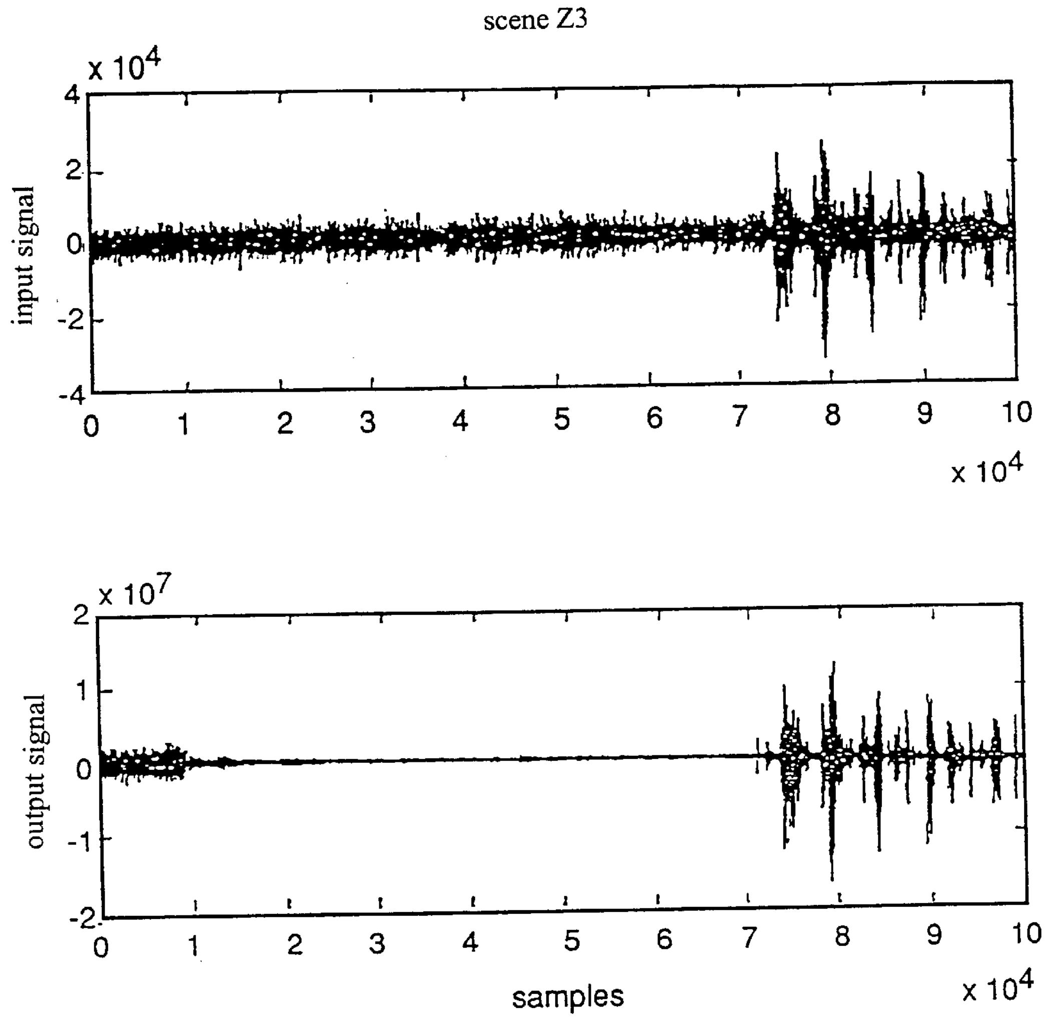
FIG. 23 shows the input and output signals from a third measuring scene.
Figure 24:
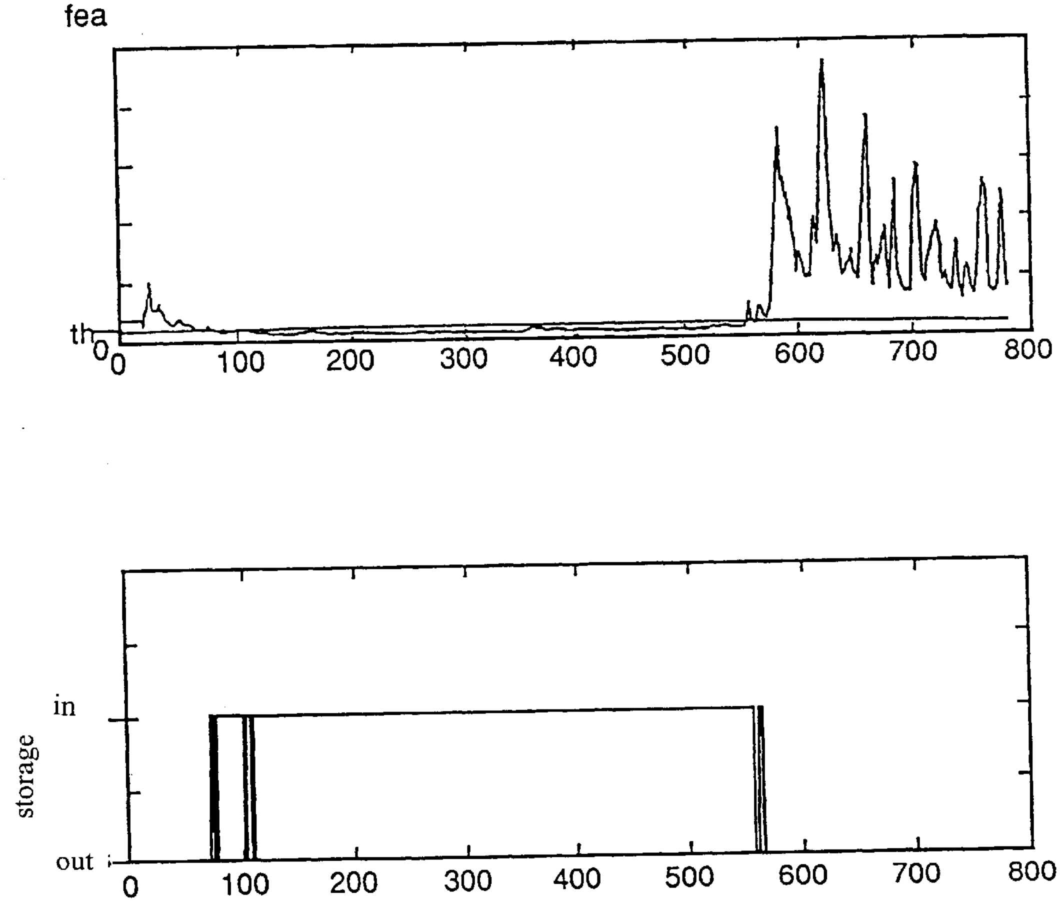
FIG. 24 shows the detection of a speech pause in the example of FIG. 23.
Figure 25:
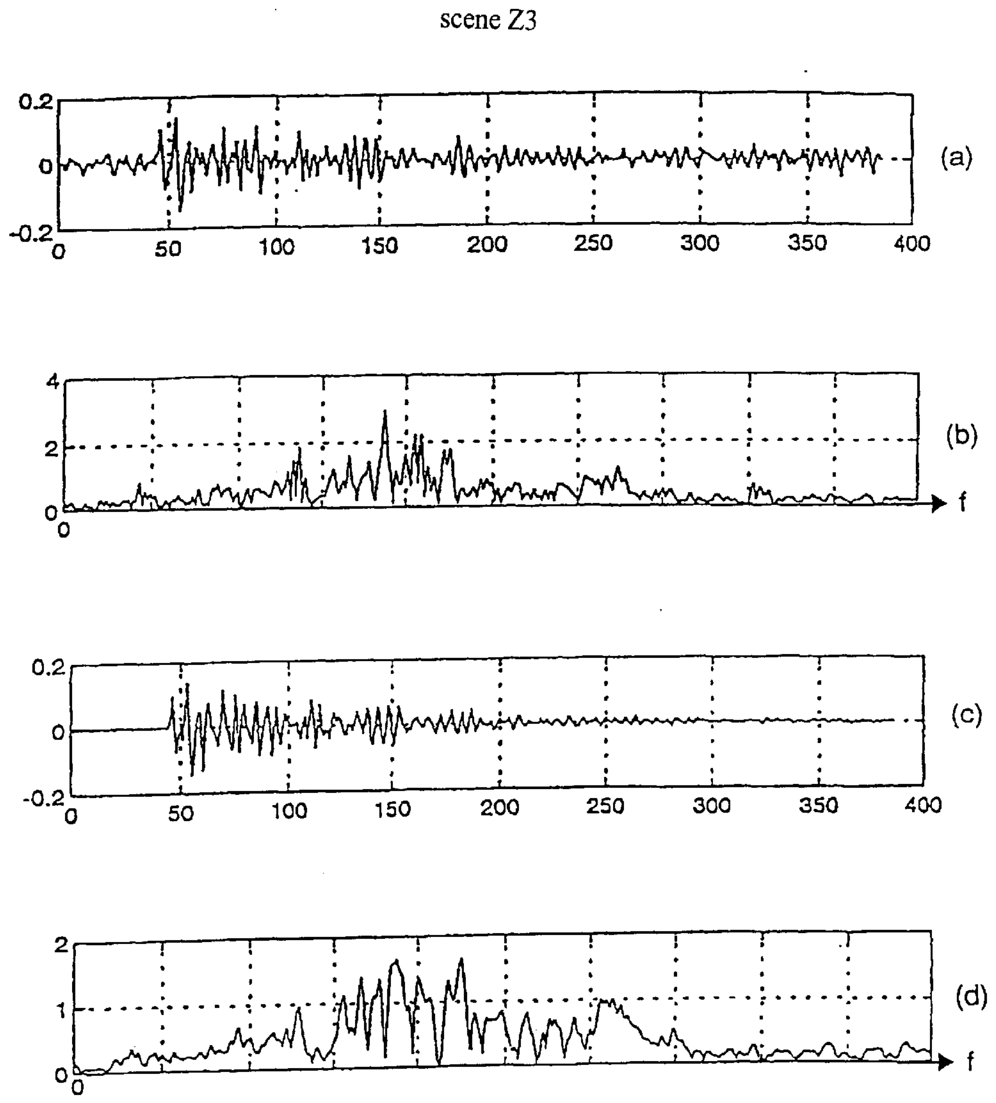
FIG. 25 shows the pulse responses and transfer functions corresponding to the example of FIGS. 23 and 24.

The first 100 000 samples of a measuring scene Z3 with POP music on the radio and language spoken fluidly to rapidly by a person, sitting in the right rear, are recorded in the form of microphone signals y, on the top in FIG. 23. After approximately 10 000 samples (0.83 s) the radio signal is usefully suppressed (bottom of FIG. 23). The suppression of the POP music is effectively maintained, even during the voice input that starts during the last third of this scene. As a result of this, there is a marked improvement in the audibility of the speech as compared to the microphone signal. Following a long speech pause, the values no longer fall below the threshold (FIG. 24), owing to the subsequent voice input without pauses. For that reason, the pulse response on the basis of the stored coefficients, which is recorded at the end of the scene and is shown in FIG. 25 at the bottom, is relatively old with respect to time because is was current approximately 2.3 seconds earlier (215 blocks*10.7 ms). The current pulse response (FIG. 25 top) again displays a strong interference, caused by the voice input. As shown in a comparison with the similar scene Z1 in FIGS. 11 to 15, the quality of the interference elimination remains high, despite the strongly reduced calculation expenditure.

Figure 26:
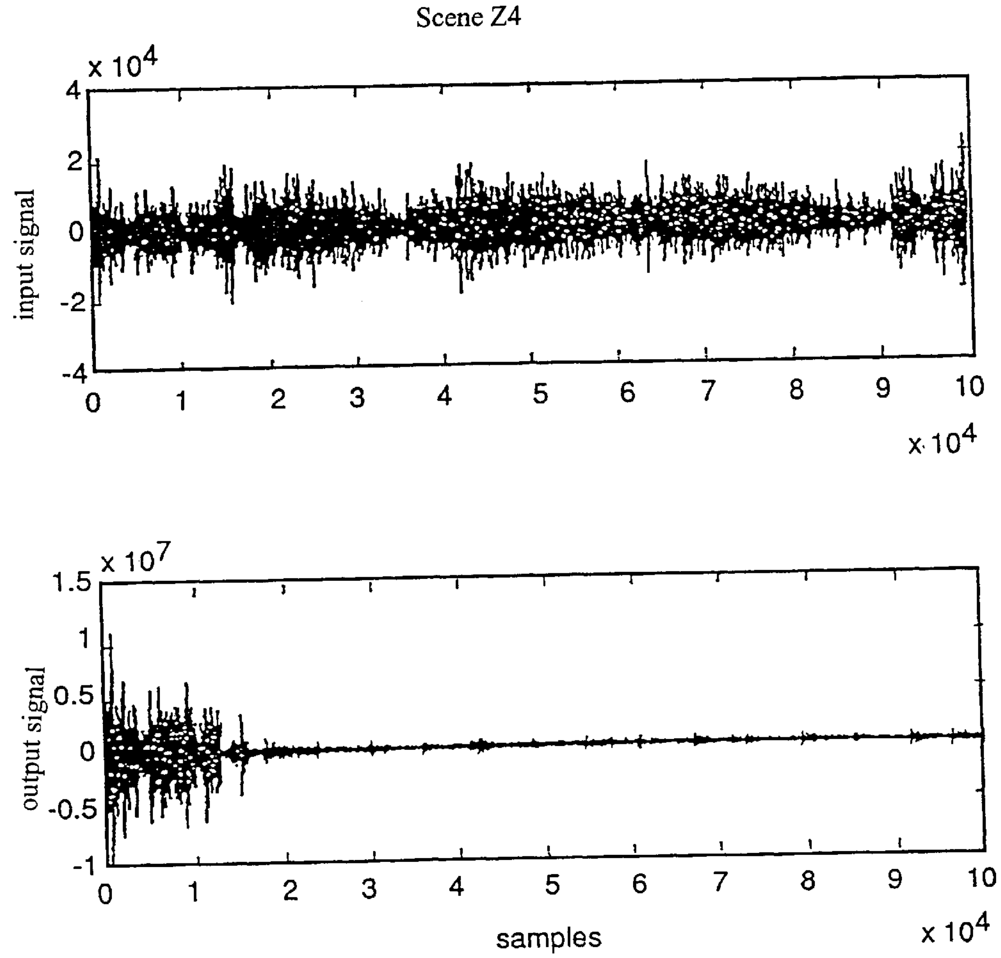
FIG. 26 shows the input and output signals from a fourth measuring scene.
Figure 27:
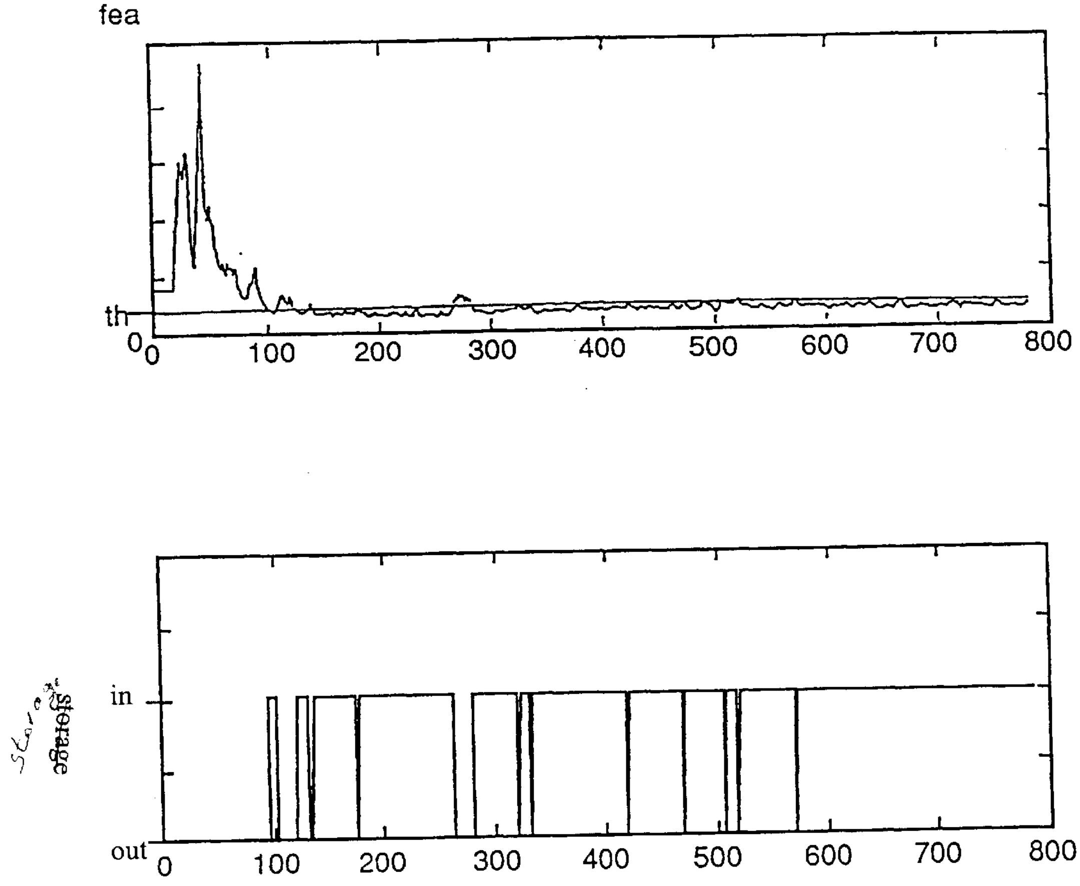
FIG. 27 shows the detection of a speech pause in the example of FIG. 26.
Figure 28:
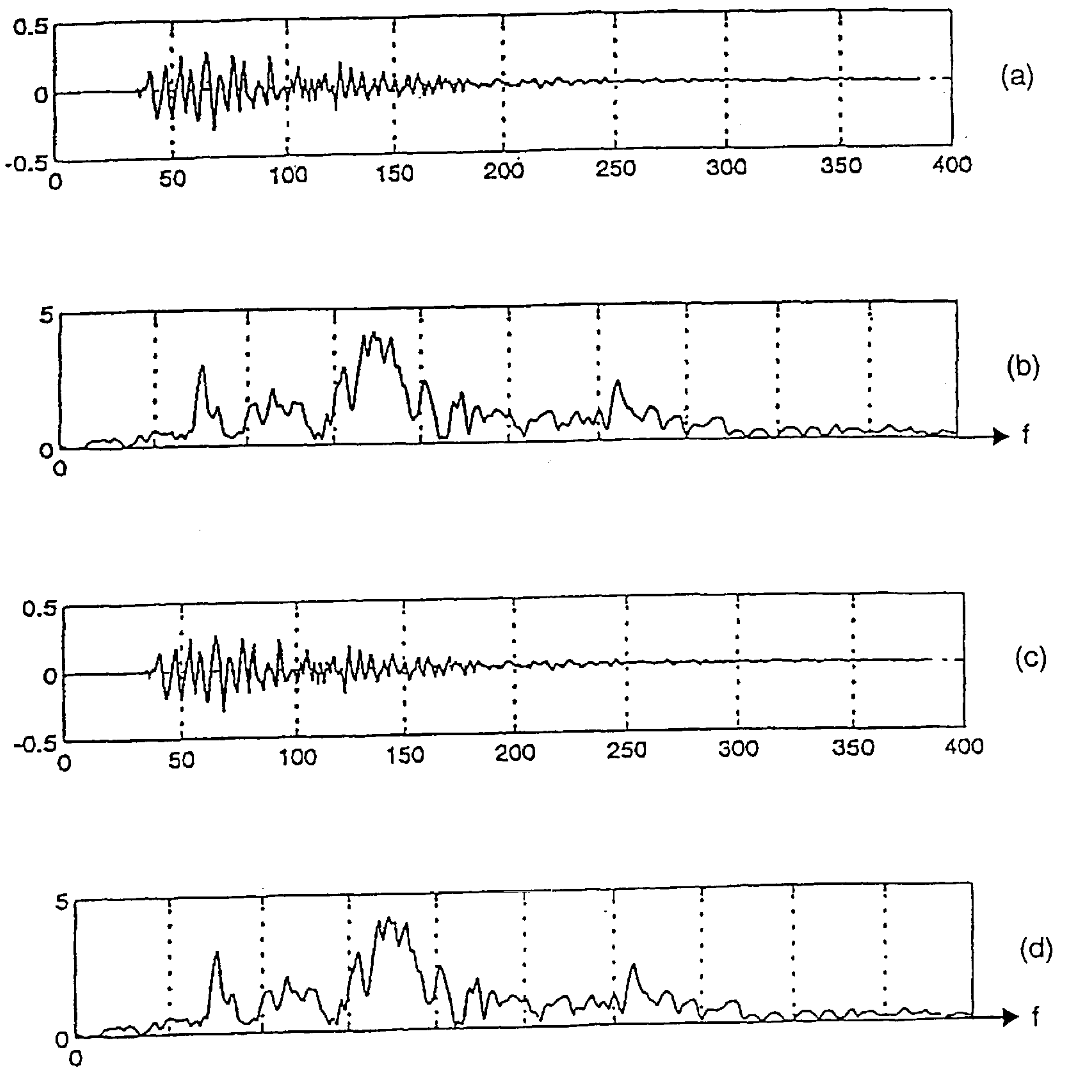
FIG. 28 shows the pulse responses and transfer functions corresponding to the example of to FIGS. 26 and 27.

The last scene Z4 according to FIG. 26 was created without voice input and, in conclusion, is designed to demonstrate the music suppression qualities of the described FLMS algorithm once more. After approximately 18 000 samples or 1.5 seconds, the music is effectively suppressed, as can be seen on the bottom in FIG. 26. This feature is maintained with unchanged quality until the end of the scene. FIG. 27 demonstrates that the speech pause variable fea for the most part remains below the threshold th. The times for falling back to the stored coefficients are therefore very short. Pulse response and transfer function, obtained from current coefficients, are therefore essentially identical to the corresponding courses for the speech pause coefficients.

The invention now fully described, it will be apparent to one of the ordinary skill in the art that many changes and modifications can be made thereto without departing from the spirit or scope of the invention as set forth herein

What is claimed:

1. A method of eliminating interference in a microphone signal, which interference is caused by components of a source signal that is present as a reference signal (x) and, following a pass through a transfer section with a priori unknown transmission function (G), is superimposed in the microphone signal as an interference signal (r) on a voice signal (s), said method comprising: adaptively simulating the interference signal, and providing an output signal which has been compensated for the actual interference signal by subtraction of the simulated interference signal from the microphone signal, and wherein the microphone signal is simultaneously transformed to the frequency domain, the signal compensation occurs in the frequency domain, and the output signal present in the frequency domain is linked with the reference signal present in the frequency domain for the adaptation of the simulation of the reference signal, transforming the output signal spectrum to the time domain, doubling the time signal length by placing zeros in front of the time signal, transforming the length and time signal back to the frequency domain and, using the transformed frequency domain signal for the simulation of the transfer function.

2. A method according to claim 1, further comprising convoluting the output signal spectrum with the spectrum of a Hamming time window, and using the convoluted output signal for the simulation of the transfer function.

3. A method according to claim 1 wherein said step of adaptively simulating includes applying an adaptive filtering function of a simulation filter to the reference signal to simulate the interference signal component.

4. A method according to claim 3, wherein the filtering function is specified by a coefficient vector with adaptively adjusted coefficients.

5. A method according to claim 3 further comprising detecting the occurrence of a voice signal component in the microphone signal, and if a voice signal is detected, adjusting the filtering function prior to the occurrence of the voice signal for providing the compensation to generate the output signal.

6. A method according to claim 5, wherein the adaptive readjustment of an actual filtering function is continued in addition to generating the output signal, even if a voice signal is detected.

7. A method according to claim 6, wherein the occurrence of a voice signal is detected through a change in the current filtering function.

8. A method according to claim 7, wherein the change in the current filtering function is smoothed over time to detect the occurrence of a voice signal.

9. A method according to claim 3, including dividing the filtering function into several partial filtering functions for successive segments of a total pulse response from all partial filters, and applying the segmented reference time signal to the reference signal spectra during segments that are displaced in time.

10. A method according to claim 9, wherein the adaptation of the filtering function is carried out in parallel for the partial filters.

11. A method according to claim 9, wherein the adaptation of the filtering function for the individual partial filters is carried out sequentially in time.

* * * * *